United States Patent
Aruga et al.

(10) Patent No.: US 8,501,313 B2
(45) Date of Patent: Aug. 6, 2013

(54) WAVELENGTH CONVERSION FILM, AGRICULTURAL FILM, STRUCTURE AND COATING FILM FORMING COMPOSITION

(75) Inventors: Hiroshi Aruga, Chiyoda-ku (JP); Yasuko Shimoi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 275 days.

(21) Appl. No.: 12/572,333

(22) Filed: Oct. 2, 2009

(65) Prior Publication Data

US 2010/0021739 A1     Jan. 28, 2010

Related U.S. Application Data

(63) Continuation of application No. PCT/JP2008/056697, filed on Apr. 3, 2008.

(30) Foreign Application Priority Data

Apr. 6, 2007  (JP) ................... 2007-100328

(51) Int. Cl.
*A01G 13/02*  (2006.01)
*B32B 27/18*  (2006.01)
*B32B 27/20*  (2006.01)

(52) U.S. Cl.
USPC ........... 428/328; 428/329; 428/331; 428/421; 47/29.4

(58) Field of Classification Search
USPC .......................................... 47/29.4
See application file for complete search history.

(56) References Cited

U.S. PATENT DOCUMENTS

| | | | | |
|---|---|---|---|---|
| 3,352,058 A | * | 11/1967 | Brant | 47/58.1 R |
| 4,952,443 A | * | 8/1990 | Gravisse | 428/131 |
| 5,262,233 A | * | 11/1993 | Sudo et al. | 428/327 |
| 5,771,630 A | * | 6/1998 | Harasawa et al. | 47/29.4 |
| 6,235,270 B1 | * | 5/2001 | Ishii et al. | 424/59 |
| 6,534,044 B1 | | 3/2003 | Wada et al. | |

FOREIGN PATENT DOCUMENTS

| | | |
|---|---|---|
| CN | 1340086 A | 3/2002 |
| CN | 1719282 A | 1/2006 |
| EP | 0 142 773 A1 | 5/1985 |
| JP | 07-170865 | 7/1995 |
| JP | 8-224836 | 9/1996 |
| JP | 08-252882 | 10/1996 |
| JP | 2000-212554 | 8/2000 |
| JP | 2000-287559 | 10/2000 |
| JP | 2001-200107 | 7/2001 |
| JP | 2006-249402 | 9/2006 |
| WO | 00/24243 | 5/2000 |

OTHER PUBLICATIONS

U.S. Appl. No. 13/090,423, filed Apr. 20, 2011, Shimoi, et al.

(Continued)

*Primary Examiner* — Ramsey Zacharia
(74) *Attorney, Agent, or Firm* — Oblon, Spivak, McClelland, Maier & Neustadt, L.L.P.

(57) ABSTRACT

To provide a wavelength conversion film which is capable of maintaining an optical wavelength converting function for a longer period of time than conventional wavelength conversion films.

A wavelength conversion film 10 containing an inorganic ultraviolet blocking material and a wavelength converting material, which consists of one or more layers, at least one of which is a base film layer 12 containing a thermoplastic resin.

14 Claims, 8 Drawing Sheets

OTHER PUBLICATIONS

Office Action issued Feb. 24, 2012, in Chinese Patent Application No. 200880011302.1 (submitting English-language translation only, Chinese Office Action previously filed Apr. 18, 2012).
Office Action issued Feb. 24, 2012, in Chinese Patent Application No. 200880011302.1 filed Apr. 3, 2008.
U.S. Appl. No. 13/682,856, filed Nov. 21, 2012, Shimoi, et al.
Office Action issued Mar. 26, 2013, in Japanese Patent Application No. 2009-509305 (with English translation).
Supplementary European Search Report issued May 23, 2013, in European Patent Application No. 08739804.6 filed Apr. 3, 2008.

* cited by examiner

WAVELENGTH CONVERSION FILM, AGRICULTURAL FILM, STRUCTURE AND COATING FILM FORMING COMPOSITION

TECHNICAL FIELD

The present invention relates to a wavelength conversion film, an agricultural film made thereof, a structure using the wavelength conversion film as a roofing material or a wall covering material, and a coating film forming composition for forming a coating layer of the wavelength conversion film.

BACKGROUND ART

Greenhouse farming for cultivation of plants in a greenhouse is widely adopted because it brings much greater yield amount and much better quality than open field farming. Recently, for the purpose of further improvement of yield and quality, adjustment of picking season, reducing the period of cultivation, and so on, it has been attempted to convert ultraviolet light, which is harmful to plants, to blue light, which is helpful for photosynthesis, or to convert a light of green to yellow range, which has low photosynthesis efficiency, to a light of orange to red range, which has high efficiency of photosynthesis, by means of an agricultural film used for a greenhouse.

As a wavelength conversion film which has a function to convert a light with a specific wavelength to a light with a different wavelength (hereinafter referred to as wavelength converting function), the following one is proposed: an agricultural wavelength conversion material wherein a non-fluororesin film containing an organic ultraviolet absorbent and a non-fluororesin film containing two kinds of fluorescent colorants as wavelength converting components are laminated (Patent Document 1).

However, this wavelength conversion film has the following problems:

(1) the wavelength converting function decreases substantially after long-term use; and (2) the visible light transmittance of the film itself is low; that is, the film itself absorbs light significantly and, as a result, the light intensity after conversion of the wavelength is lower than the light intensity with the wavelength in the sunlight before incidence.

Patent Document 1: JP-A-170865

DISCLOSURE OF THE INVENTION

Object to be Accomplished by the Invention

The present invention provides a wavelength conversion film which is capable of maintaining the optical wavelength converting function for a longer period of time than conventional wavelength conversion films.

And, the present invention also provides a wavelength conversion film which provides a higher light intensity after conversion of the wavelength than conventional wavelength conversion films.

Means to Accomplish the Object

The wavelength conversion film of the present invention is a wavelength conversion film containing an inorganic ultraviolet blocking material and a wavelength converting material, and consisting of one or more layers, at least one of which is a base film layer containing a thermoplastic resin.

The wavelength conversion film of the present invention is preferably: a wavelength conversion film consisting of only one layer of the base film layer, wherein the base film contains the inorganic ultraviolet blocking material and the wavelength converting material; a wavelength conversion film consisting of two or more layers, one of which contains the inorganic ultraviolet blocking material and the wavelength converting material; or a wavelength conversion film consisting of two or more layers, one of which contains the inorganic ultraviolet blocking material and another of which contains the wavelength converting material.

The wavelength conversion film of the present invention may be a wavelength conversion film, wherein the base film layer consists of at least two layers.

The wavelength conversion film of the present invention may be a wavelength conversion film, wherein at least one layer is the base film layer and at least another layer is a coating layer containing a resin.

At least one of the coating layers preferably contains a fluororesin as the resin.

At least one base film layer preferably contains a thermoplastic fluororesin as the thermoplastic resin.

The thermoplastic fluororesin is preferably an ethylene/tetrafluoroethylene copolymer or polyvinylidene fluoride.

The wavelength converting material is preferably a fluorescent colorant or a phosphorescent pigment.

The wavelength converting material is preferably a fluorescent colorant covered with at least one selected from the group consisting of silica, alumina, zirconia and a cross-linked acrylic resin.

The fluorescent colorant is preferably a pi-conjugated organic colorant or an oxazine colorant.

The inorganic ultraviolet blocking material is preferably a metal oxide.

The inorganic ultraviolet blocking material is preferably a metal oxide covered with at least one selected from the group consisting of silica, zirconia and alumina.

The metal oxide is preferably at least one selected from the group consisting of cerium oxide, zinc oxide, titanium oxide and iron oxide.

The agricultural film of the present invention is made of the wavelength conversion film of the present invention.

The agricultural film of the present invention preferably further has a droplet flowing layer formed on one or both sides of the wavelength conversion film.

The coating film forming composition of the present invention comprises a wavelength converting material, an inorganic ultraviolet blocking material, a resin and a liquid medium.

The structure of the present invention uses the wavelength conversion film as a roofing material or a wall covering material, wherein the wavelength conversion film consists of two or more layers, one of which contains the inorganic ultraviolet blocking material and another of which contains the wavelength converting material, and is characterized in that the wavelength conversion film is disposed so that the ultraviolet blocking layer is on the sunlight-incoming side.

The structure of the present invention uses a resin film containing a wavelength converting material and not containing an inorganic ultraviolet blocking material and a resin film containing an inorganic ultraviolet blocking material in pairs as a roofing material or a wall covering material, characterized in that the resin film containing the inorganic ultraviolet blocking material is disposed on the sunlight-incoming side.

Effects of the Invention

The wavelength conversion film of the present invention is capable of maintaining an optical wavelength converting function for a longer period of time than conventional wavelength conversion films.

Further, the wavelength conversion film of the present invention, when the thermoplastic resin of it is a thermoplastic fluororesin, provides a higher light intensity after conversion of the wavelength than conventional wavelength conversion films.

DESCRIPTION OF SYMBOLS

Figure 1:
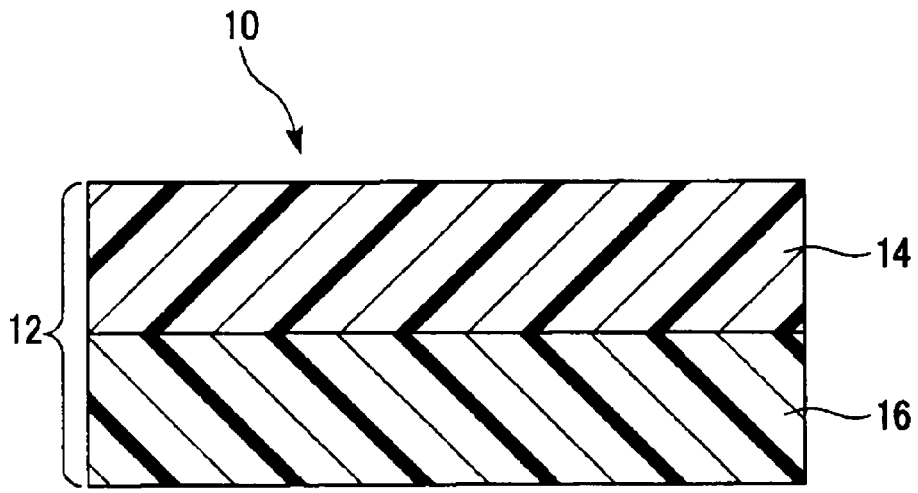
FIG. 1 is a cross-sectional view illustrating an embodiment of the wavelength conversion film of the present invention.

10: Wavelength conversion film
12: Base film layer
14: Ultraviolet blocking layer
16: Wavelength converting layer
18: Coating layer
20: Wavelength converting/ultraviolet blocking layer

BEST MODE FOR CARRYING OUT THE INVENTION

Wavelength Conversion Film

The wavelength conversion film of the present invention is a wavelength conversion film which contains a base film layer containing a thermoplastic resin, and which contains at least an inorganic ultraviolet blocking material and a wavelength converting material somewhere in the film. More specifically, the following constructions may, for example, be mentioned:

(1) a wavelength conversion film consisting of only one layer of a base film layer, wherein the base film layer contains an inorganic ultraviolet blocking material and a wavelength converting material (e.g. Embodiment 6 described below);

(2) a wavelength conversion film consisting of two or more layers, one of which contains the inorganic ultraviolet blocking material and the wavelength converting material, wherein;

(2-1) the base film layer contains an inorganic ultraviolet blocking material and a wavelength converting material (e.g. Embodiment 8 described below); or (2-2) a coating layer containing a resin, contains an inorganic ultraviolet blocking material and a wavelength converting material (e.g. Embodiment 7 and Embodiment 9 described below); and (3) a wavelength conversion film consisting of two or more layers, one of which is an ultraviolet blocking layer containing an inorganic ultraviolet blocking material and another of which is a wavelength converting layer containing a wavelength converting material, wherein;

(3-1) the base film layer consists of one ultraviolet blocking layer and one wavelength converting layer (e.g. Embodiment 1 described below);

(3-2) the base film layer is either an ultraviolet blocking layer or a wavelength converting layer, and the coating layer containing a resin, is the other of the two types of layers (e.g. Embodiment 2 described below); or (3-3) one coating layer containing a resin is an ultraviolet blocking layer, and another coating layer is a wavelength converting layer (e.g. Embodiment 3, Embodiment 4, and Embodiment 5 described below).

In this specification, a "film" includes a "sheet".

Embodiment 1

FIG. 1 is a cross-sectional view illustrating an embodiment of the wavelength conversion film of the present invention. The wavelength conversion film 10 has a base film layer 12 consisting of two or more layers and containing a thermoplastic resin.

(Base Film Layer)

The base film layer 12 is a layer formed by melting a material containing a thermoplastic resin.

When the base film layer 12 consists of two layers, one of the two layers is also an ultraviolet blocking layer 14 which contains an inorganic ultraviolet blocking material, and the other is also a wavelength converting layer 16 which contains a wavelength converting material.

The thermoplastic resin in the ultraviolet blocking layer 14 and the thermoplastic resin in the wavelength converting layer 16 may be the same or different.

The thermoplastic resin may, for example, be a thermoplastic olefin resin, a thermoplastic chlororesin, a thermoplastic acrylic resin, a thermoplastic polyester resin or a thermoplastic fluororesin, and is preferably a thermoplastic olefin resin, a thermoplastic acrylic resin or a thermoplastic fluororesin, particularly preferably a thermoplastic fluororesin.

The thermoplastic olefin resin may, for example, be a homopolymer of an α-olefin (such as polyethylene or polypropylene), a copolymer of α-olefins (such as an ethylene/propylene copolymer, an ethylene/buthene-1 copolymer, an ethylene/hexene copolymer or an ethylene/octene copolymer) or a copolymer of an α-olefin with another monomer (such as an ethylene/vinyl acetate copolymer (hereinafter referred to as EVA), an ethylene/acrylic acid copolymer, an ethylene/methyl methacrylate copolymer or an ethylene/vinyl acetate/methyl methacrylate copolymer).

The thermoplastic chlororesin may, for example, be polyvinyl chloride, a vinyl chloride/methyl methacrylate copolymer or polyvinylidene chloride.

The thermoplastic acrylic resin may, for example, be a polymer obtained by polymerizing at least one monomer selected from the group consisting of methyl acrylate, ethyl acrylate, n-propyl acrylate, n-butyl acrylate, isopropyl acrylate, 2-ethylhexyl acrylate, decyl acrylate, methyl methacrylate, ethyl methacrylate, n-propyl methacrylate, n-butyl methacrylate, isopropyl methacrylate, 2-ethylhexyl methacrylate and decyl methacrylate.

The thermoplastic polyester resin may, for example, be polyethylene terephthalate or polybutylene naphthalate.

The thermoplastic fluororesin may, for example, be a vinyl fluoride polymer, a vinylidene fluoride polymer (hereinafter referred to as PVDF), a vinylidene fluoride/hexafluoropropylene copolymer, a tetrafluoroethylene/hexafluoropropylene/vinylidene fluoride copolymer (hereinafter referred to as THV), a tetrafluoroethylene/propylene copolymer, a tetrafluoroethylene/vinylidene fluoride/propylene copolymer, an ethylene/tetrafluoroethylene copolymer (hereinafter referred to as ETFE), a hexafluoropropylene/tetrafluoroethylene copolymer (hereinafter referred to as HFP), or a perfluoro(alkyl vinyl ether)/tetrafluoroethylene copolymer (hereinafter referred to as PFA). From the viewpoint of transparency and weather resistance, ETFE, HFP, PFA, THV or PVDF is preferred, and ETFE or PVDF is more preferred.

(Ultraviolet Blocking Layer)

The ultraviolet blocking layer 14 is a base film layer 12 which contains an inorganic ultraviolet blocking material, that is, a layer formed by melting a material containing a thermoplastic resin and an inorganic ultraviolet blocking material.

The inorganic ultraviolet blocking material may, for example, be at least one metal oxide selected from the group consisting of cerium oxide, zinc oxide, titanium oxide and iron oxide. The inorganic ultraviolet blocking material is preferably cerium oxide or zinc oxide.

The inorganic ultraviolet blocking material is more preferably the above metal oxide covered with at least one inorganic oxide selected from the group consisting of silica, zirconia and alumina, from the following viewpoints:

(i) when it exists in a fluororesin, it inhibits corrosion of the metal oxide caused by hydrogen fluoride produced at the time of melt forming of the film or during outdoor use, and it maintains the ultraviolet blocking function for a long term; and (ii) it inhibits photoactivity of the photocatalyst such as cerium oxide, zinc oxide, titanium oxide, etc., as a result, it inhibits deterioration of the resin film and decomposition of the wavelength converting material.

For improving the dispersibility to the resin constituting the ultraviolet blocking layer 14, it is also preferred that the surface of the above inorganic oxide is additionally hydrophobized with silicone, a silane coupling agent, etc.

The average particle size of the inorganic ultraviolet blocking material is preferably from 0.01 to 0.5 μm, more preferably from 0.02 to 0.2 μm.

The content of the inorganic ultraviolet blocking material is preferably from 0.03 to 6 mass %, more preferably from 0.1 to 3 mass %, in the ultraviolet blocking layer 14 (100 mass %). When the content of the inorganic ultraviolet blocking material is at least 0.03 mass %, the ultraviolet blocking layer 14 with a sufficient ultraviolet blocking function is obtained. When the content of the inorganic ultraviolet blocking material is at most 6 mass %, the ultraviolet blocking layer 14 having a sufficient visible light transmittance is obtained.

The thickness of the ultraviolet blocking layer 14 is preferably from 6 to 250 μm, more preferably from 10 to 150 μm, particularly preferably from 20 to 100 μm. When the thickness of the ultraviolet blocking layer 14 is at least 6 μm, the wavelength conversion film 10 having a sufficient strength is obtained. When the thickness of the ultraviolet blocking layer 14 is at most 250 μm, the ultraviolet blocking layer 14 having a sufficient visible light transmittance is obtained.

The visible light transmittance of the ultraviolet blocking layer 14 is preferably at least 80%, more preferably at least 85%. When the visible light transmittance of the ultraviolet blocking layer 14 is at least 80%, the wavelength conversion film 10 having a sufficiently high light intensity after conversion of the wavelength is obtained.

The ultraviolet transmittance of the ultraviolet blocking layer 14 is preferably at most 50%, more preferably at most 40%. When the ultraviolet transmittance of the ultraviolet blocking layer 14 is at most 50%, the decomposition of a wavelength converting material is inhibited adequately.

The visible light transmittance and the ultraviolet transmittance are measured in accordance with JIS R3106:1998 "Test method for transmittance, reflectance, emissivity, solar radiation heat acquiring efficiency of sheet glass".

(Wavelength Converting Layer)

The wavelength converting layer 16 is a base film layer 12 which contains a wavelength converting material, that is, a layer formed by melting a material containing a thermoplastic resin and a wavelength converting material.

The wavelength converting material is a material which has an absorption wavelength and an emission wavelength in the ultraviolet range or the visible range. Thus, it does not include a material which only absorbs or only reflects a light with a specific wavelength, such as a color pigment (e.g. white titanium oxide or phthalocyanine blue).

The wavelength converting material may, for example, be an organic wavelength converting material or an inorganic wavelength converting material.

The organic wavelength converting material may, for example, be a fluorescent colorant (a fluorescent pigment), which absorbs ultraviolet or visible light and emits a fluorescent color.

The followings may be mentioned as examples of the fluorescent colorant:

a colorant which emits light in an ultraviolet range (from 300 nm to 400 nm), such as a terphenylene colorant or an oxazoline colorant;

a colorant which emits light in a blue to green wavelength range (from 400 nm to 500 nm), such as a coumarin colorant;

a colorant which emits light in a green to red wavelength range (from 500 nm to 800 nm) depending on its substituted group, such as an indole colorant;

a colorant which emits light in a yellow to red wavelength range (from 500 nm to 800 nm), such as a malachite green colorant or a rhodamine colorant;

a colorant which emits light in a deep red wavelength range (from 630 nm to 750 nm), such as a oxazine colorant; and a colorant which emits light in a wide range of wavelength depending on its substituted group, such as a pi-conjugated organic colorant (e.g. an anthracene colorant, a pyrene colorant or a perylene colorant).

Among these colorants, a pi-conjugated organic colorant or an oxazine colorant is preferred, a pi-conjugated organic colorant is more preferred, and a perylene colorant is further preferred, because it has a peak emission wavelength in a range from 600 nm to 700 nm, which is most important for photosynthesis.

The inorganic wavelength converting material may, for example, be a phosphorescent pigment, which absorbs ultraviolet or visible light and emits visible light.

The phosphorescent pigment is generally a white pigment which has a particle size of about from 2 μm to 20 μm. The larger its particle size is, the higher its wavelength converting efficiency is, however, when the particle is submicron size, the wavelength converting function deteriorates. As a result, the absorption and emission are usually at quite low level. Thus, an agricultural film which contains a phosphorescent pigment has a sunlight blocking effect which is greater than effect of amplifying a specific wavelength of sunlight, and therefore, it is not suitable for growth of a plant, for which sunlight is indispensable, however, it is capable of providing a light to plants even after sunset.

One of the wavelength converting materials may be used alone, or two or more may be used in combination. When two or more wavelength converting materials are used in combination, the emission spectrum of one of them may partly overlap with the absorption spectrum of another wavelength converting material. And, an organic wavelength converting material and an inorganic wavelength converting material may be used in combination. Although many wavelength converting materials are down-conversion type, which absorbs light with short wavelength having high energy and emits light with long wavelength having low energy, up-conversion type, the reverse of the former, may also be used.

The wavelength converting material is preferably a fluorescent colorant or a phosphorescent pigment covered with at least one selected from the group consisting of silica, alumina, zirconia and a cross-linked acrylic resin because of the following points. Even after a fluorescent colorant or a phosphorescent pigment is covered with such a material, the wavelength converting function by the intramolecular or intermolecular conformation change of the fluorescent colorant or the phosphorescent pigment is maintained:

(i) when it exists in a fluororesin, it inhibits decomposition of the wavelength converting material caused by hydrogen fluoride produced at the time of melt forming of the film or during outdoor use, and thus it maintains the wavelength converting function for a long term;

(ii) it inhibits decomposition of the wavelength converting material caused by a photocatalyst such as cerium oxide, zinc oxide or titanium oxide, and thus it maintains the wavelength converting function for a long term;

(iii) the solubility and the dispersibility of the wavelength converting material in a resin constituting the wavelength converting layer 16 do not depend on the type of a resin, and thus the wavelength converting function does not substantially depend on the type of a resin;

(iv) even when the temperature is increased by the sunlight, it inhibits volatilization of the wavelength converting material, and thus it maintains the wavelength converting function for a long term;

(v) even when water is deposited by condensation on the surface of the wavelength converting film 10, dissolution loss of the wavelength converting material to water is little, and thus, even if the content of the wavelength converting material is reduced, it maintains the wavelength converting function for a long term; and (vi) when the wavelength converting material is covered with a cross-linked acrylic resin, its chemicals resistance and solvent resistance are improved.

The following methods may be mentioned as examples for the method for covering a fluorescent colorant or a phosphorescent pigment:

(a) a method of covering the surface of a fluorescent colorant or a phosphorescent pigment with an inorganic oxide by the sol-gel method;

(b) a method of covering the surface of a fluorescent colorant or a phosphorescent pigment with an uncrosslinked acrylic resin fluid followed by cross-linking the acrylic resin; and (c) a method of polymerizing a monomer in the presence of a fluorescent colorant or a phosphorescent pigment to form a cross-linked acrylic resin on the surface of the fluorescent colorant or the phosphorescent pigment.

Method (a):

Specifically, in a solvent, a metal alkoxide is hydrolyzed by a catalyst in the presence of a fluorescent colorant or a phosphorescent pigment to form an inorganic oxide on the surface of the fluorescent colorant or the phosphorescent pigment.

The metal alkoxide may, for example, be of the following formula (1):

$$M(OR)_n \qquad (1)$$

wherein M represents a metal element (such as Si, Al or Zr), OR represents an alkoxy group, and n is the valence of the metal element.

The metal alkoxide is preferably $Si(OR)_4$, $Al(OR)_3$ or $Zr(OR)_4$, more preferably $Si(OR)_4$.

$Si(OR)_4$ is preferably $Si(OCH_3)_4$, $Si(OC_2H_5)_4$ (tetraethoxysilane), $Si(O\text{-iso-}C_3H_7)_4$, $Si(O\text{-tert-}C_4H_9)_4$ or $Si(O\text{-sec-}C_4H_9)_4$.

$Al(OR)_3$ is preferably $Al(OCH_3)_3$, $Al(OC_2H_5)_3$, $Al(O\text{-iso-}C_3H_7)_3$ or $Al(OC_4H_9)_3$.

$Zr(OR)_4$ is preferably $Zr(OCH_3)_4$, $Zr(OC_2H_5)_4$, $Zr(O\text{-iso-}C_3H_7)_4$ or $Zr(OC_4H_9)_4$.

The solvent may, for example, be an alcohol, and it is preferably an alcohol having from 1 to 5 carbon atoms (such as methanol, ethanol, propanol, butanol or pentanol).

The catalyst for hydrolysis may, for example, be an acid (such as hydrochloric acid, sulfuric acid, nitric acid or acetic acid) or an alkali (such as aqueous ammonia).

By the sol-gel method, hydrolysis, dehydration and dealcoholization proceed with complexity, and eventually solid $SiO_2$ is precipitates.

The amount of the inorganic oxide covering is preferably from 10 to 100 parts by mass, more preferably from 40 to 80 parts by mass, per 100 parts by mass of the fluorescent colorant or the phosphorescent pigment. When the amount of covering is at least 10 parts by mass, the above effect is sufficient. When the amount of covering is at most 100 parts by mass, the covering does not require a long time, and the covering is carried out efficiently In order to improve the dispersibility in the resin, the surface of the inorganic oxide may be hydrophobized with silicone, a silane coupling agent, etc.

Method (b):

Specifically, a low-molecular-weight acrylic resin fluid is sprayed in the form of mist to the fluorescent colorant or a phosphorescent pigment, and then the acrylic resin is cross-linked by an electron beam.

The thickness of the cross-linked acrylic resin is preferably from 0.01 to 1 μm.

The amount of covering of the cross-linked acrylic resin is preferably from 2 to 15 parts by mass per 100 parts by mass of the fluorescent colorant or the phosphorescent pigment.

Method (c):

Specifically, in the presence of a fluorescent colorant or a phosphorescent pigment, methyl methacrylate, 1,6-hexanedioldiacrylate, styrene and glycidyl methacrylate are heated at 80° C. in a nitrogen atmosphere and then polymerized by adding azobisisobutyronitrile as a polymerization initiator to deposit the cross-linked acrylic resin on the surface of the wavelength converting material.

The thickness of the cross-linked acrylic resin is preferably from 0.01 to 1 μm.

The amount of covering of the cross-linked acrylic resin is preferably from 2 to 15 parts by mass per 100 parts by mass of the fluorescent colorant or the phosphorescent pigment.

The content of non-covered wavelength converting material is preferably from 0.005 to 2 mass %, more preferably 0.008 to 1 mass %, further more preferably 0.01 to 0.1 mass %, particularly preferably from 0.015 to 0.05 mass %, in the wavelength converting layer 16 (100 mass %).

The content of the wavelength converting material covered with an inorganic oxide is preferably from 0.005 to 3.0 mass %, more preferably from 0.01 to 2.0 mass %, in the wavelength converting layer 16 (100 mass %).

The content of the wavelength converting material covered with the cross-linked acrylic resin is preferably from 0.1 to 10 mass % in the wavelength converting material 16 (100%).

However, if the content of the wavelength converting material is too high, the wavelength converting efficiency decreases, the light absorbing amount tends to be large and the absorption wavelength range is widened, so the light blocking effect tends to be strong.

And, the content of the wavelength converting material is preferably adjusted so that the photosynthetically active radiation (PAR) of the light which transmits through the wavelength converting film is at least 30% of PAR of the sunlight. If PAR of the transmitting light is less than 30%, the growth inhibition effect caused by the lack of amount of light is larger than the photosynthesis promoting effect brought by the wavelength conversion.

The thickness of the wavelength converting layer 16 is preferably from 40 to 300 μm, more preferably from 50 to 100 μm. When the thickness of the wavelength converting layer 16 is at least 40 μm, the wavelength conversion film 10 having a sufficient strength is obtained. When the thickness of the wavelength converting layer 16 is at most 300 μm, the wavelength converting layer 16 having a sufficient visible light transmittance is obtained.

(Method for Producing Wavelength Conversion Film)

The wavelength conversion film 10 is produced by the following method:

(a) a method wherein a film of the ultraviolet blocking layer 14 obtained by melt forming (such as extrusion forming or injection forming) and a film of the wavelength converting layer 16 obtained by melt forming are laminated and pass through a heated roll press to be made into a unified body by thermal fusion bonding.

(b) a method wherein a film of the ultraviolet blocking layer 14 or a film of the wavelength converting layer 16 is melt formed, and on the surface of this film, a material of the other of the two films is melt extruded and laminated; or (c) a method wherein the material for a film of the ultraviolet blocking layer 14 and the material for a film of the wavelength conversion layer 16 are melted at the same time, and then they are melt formed into a unified film in a die.

For example, when one base film layer 12 contains PVDF, it is thermal fusion bonded with the other base film layer 12 containing a thermoplastic acrylic resin. Otherwise, when one base film layer 12 contains PVDF or ETFE and the surface thereof is treated (corona discharge treatment, etc.), a material for the other base film layer 12 containing a polyethylene resin having a glycidyl group (BONDFAST, manufactured by Sumitomo Chemical Co., Ltd., etc.) is melt extruded and laminated on the former base film layer 12.

Embodiment 2

Figure 2:
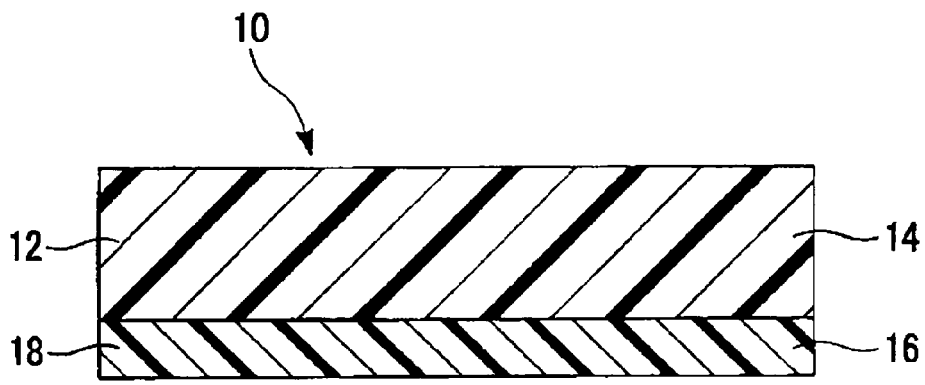
FIG. 2 is a cross-sectional view illustrating another embodiment of the wavelength conversion film of the present invention.

FIG. 2 is a cross-sectional view illustrating another embodiment of the wavelength conversion film of the present invention. The wavelength conversion film 10 has a base film layer 12 containing a thermoplastic resin and a coating layer 18 containing a resin, formed on the surface of the base film layer 12.

(Base Film Layer)

The base film layer 12 is a layer formed by melting a material containing a thermoplastic resin.

The base film layer 12 is also an ultraviolet blocking layer 14 which contains an inorganic ultraviolet blocking material.

The thermoplastic resin may be the thermoplastic resin exemplified in Embodiment 1.

(Ultraviolet Blocking Layer)

The ultraviolet blocking layer 14 is a base film layer 12 which contains an inorganic ultraviolet blocking material, that is, a layer formed by melting a material containing a thermoplastic resin and an inorganic ultraviolet blocking material.

The inorganic ultraviolet blocking material may be the ultraviolet blocking material exemplified in Embodiment 1.

The content of the inorganic ultraviolet blocking material is preferably in the same range as in Embodiment 1.

The thickness of the ultraviolet blocking layer 14 is preferably from 40 to 150 μm, more preferably from 50 to 100 μm.

The visible light transmittance of the ultraviolet blocking layer 14 is preferably in the same range as in Embodiment 1.

The ultraviolet transmittance of the ultraviolet blocking layer 14 is preferably in the same range as in Embodiment 1.

(Coating Layer)

The coating layer 18 is a layer formed by applying a resin varnish on the surface of the base film layer 12.

The coating layer 18 is also a wavelength converting layer 16 which contains a wavelength converting material.

The resin contained in the resin varnish may, for example, be a fluororesin or a non-fluororesin, and it is preferably a fluororesin from the following viewpoints:

(i) Pollens, oils, etc. are less likely to attach to the surface of the coating layer 18, and thus the visible light transmittance of the wavelength conversion film 10 is less likely to be low;

(ii) A fluororesin has high durability, and thus the wavelength converting function is maintained for a long term; and (iii) When the wavelength converting material is dispersed in the resin, the emission spectrum and the emission intensity of the wavelength converting material depend on the type of the resin. With a fluororesin, the emission intensity of the wavelength converting material becomes high compared with other resins. Specifically, the emission intensity decreases in the order of a fluororesin, an acrylic resin, an acrylpolyol resin, an acrylsilicone resin and polyethylene. The reason is considered to be as follows: a water/oil repellent fluororesin has the worst compatibility with the wavelength converting material, and the wavelength converting material aggregates without completely finely dispersed, which results in high emission intensity. In addition, absorbed or emitted light is scarcely absorbed by the fluororesin.

The fluororesin is preferably THV, or a fluoropolymer which is a copolymer of a fluoroolefin and a hydrocarbon monomer and has a functional group, because it is soluble in an organic solvent and it is easily applied on the base film layer 12.

The THV may, for example, be THV, manufactured by Dyneon LLC.

The fluoropolymer which is a copolymer of a fluoroolefin and a hydrocarbon monomer and has a functional group may, for example, be LUMIFLON, manufactured by Asahi Glass Company, Limited.

The fluoroolefin is preferably a fluoroolefin such as tetrafluoroethylene, chlorotrifluoroethylene, vinylidene fluoride or perfluoropropylvinyl ether, particularly preferably tetrafluoroethylene or chlorotrifluoroethylene.

The hydrocarbon monomer is preferably an alkenyl ether monomer such as a vinyl ether, an allyl ether or an isopropenyl ether, or an alkenyl ester monomer such as a vinyl ester of a carboxylic acid, an allyl ester of a carboxylic acid or an ester of an unsaturated carboxylic acid. Particularly, the hydrocarbon monomer preferably consists of at least one ether, or a combination of at least one vinyl ether and at least another hydrocarbon monomer (particularly preferably a vinyl ester of a carboxylic acid). The vinyl ether is preferably an alkyl vinyl ether such as ethyl vinyl ether or butyl vinyl ether, a cycloalkyl vinyl ether such as cyclohexyl vinyl ether, or a hydroxyalkyl vinyl ether. The vinyl ester of a carboxylic acid may, for example, be vinyl acetate or vinyl pivalate.

The proportion of the fluoroolefin units in all repeating units of the copolymer of a fluoroolefin and a hydrocarbon monomer is preferably from 30 to 70 mol %, particularly preferably from 40 to 60 mol %.

The functional group is preferably a hydroxy group, a carboxyl group or an epoxy group. And, a fluoropolymer may have two or more types of functional groups, for example, a fluoropolymer having a hydroxy group and a carboxyl group may be used. The functional groups such as a hydroxy group, a carboxyl group or an epoxy group is obtained by copolymerizing hydrocarbon monomers having these functional groups. The hydrocarbon monomers having these functional groups may, for example, be 4-hydroxybutyl vinyl ether, glycidyl vinyl ether and glycidyl vinyl ester. A particularly preferred fluoropolymer is a fluoropolymer having a hydroxy group. The hydroxy value is preferably from 10 to 150 mgKOH/g resin.

The non-fluororesin may, for example, be an acrylpolyol resin, an acrylic resin, an acrylsilicone resin, polyethylene or polypropylene.

The acrylpolyol resin may, for example, be ACRYLET QT507-28, manufactured by TAISEI FINE CHEMICAL CO., LTD.

The acrylic resin may, for example, be DIANAL BP80, manufactured by Mitsubishi Rayon Co., Ltd.

The acrylsilicone resin may, for example, be Silacoat SCT-8102, manufactured by CHISSO CORPORATION.

(Wavelength Converting Layer)

The wavelength converting layer 16 is a coating layer 18 containing a wavelength converting material, that is, a layer formed by applying a resin varnish containing a wavelength converting material on the surface of the base film layer 12.

The wavelength converting material may be the wavelength converting material exemplified in Embodiment 1.

The content of the wavelength converting material is preferably in the same range as in Embodiment 1.

The thickness of the wavelength converting layer 16, as a coating after drying, is preferably from 1 to 50 μm, more preferably from 2 to 30 μm, particularly preferably from 3 to 20 μm.

(Method for Producing Wavelength Conversion Film)

The wavelength conversion film 10 is produced by a method wherein a resin varnish containing the wavelength converting material is applied on the surface of the base film layer 12 as the ultraviolet blocking layer 14 obtained by melt forming, and then dried to form the coating layer 18 (the wavelength converting layer 16).

The resin varnish may, for example, be a type of a resin dissolved in an organic solvent or a type of a resin dispersed in water, etc.

The organic solvent may, for example, be toluene, xylene, methyl ethyl ketone, an alcohol, Solvesso, anone or N-methylpyrrolidone.

The optimal organic solvent is selected in each case from the viewpoint of the repellency against the resin varnish, the transcription rate, the drying property, the preservation stability of the resin varnish, etc.

The method for applying the resin varnish may, for example, be the gravure printing method or the screen printing method. When the gravure printing method is used, the organic solvent, is preferably toluene, xylene, methyl ethyl ketone or a mixture of these solvents, because it wets the surface of the base film layer 12 well, and its boiling point is not very high.

The coating layer 18 (the wavelength converting layer 16) may be formed on the entire surface of the base film layer 12 (the ultraviolet blocking layer 14) or on parts of the surface of the base film layer 12 (e.g. dot pattern).

When the resin varnish is applied, the surface of the base film layer 12 (the ultraviolet blocking layer 14) may be treated in order to improve the adhesion between the base film layer 12 (the ultraviolet blocking layer 14) and the coating layer 18 (wavelength converting layer 16).

The method for treating the surface may, for example, be corona discharge treatment, metal sodium treatment, mechanical roughening treatment or excimer laser treatment, and it is preferably corona discharge treatment because of its inexpensiveness.

When corona discharge treatment is carried out, it is advantageous for the production process to dispose the corona discharge treatment machine on the production line of the base film layer 12 and to treat the film sequentially. The treating condition is selected depending on the material of the film to be treated and the desired degree of the treatment. The conditions for the corona discharge treatment are preferably an intensity of from 0.1 to 10 kW and a treating time of 0.5 to 100 m²/min.

The surface is preferably treated so that the surface tension of the base film layer 12 will be at least 0.035 N/m in order to obtain good adhesion between the base film layer 12 (the ultraviolet blocking layer 14) and the coating layer 18 (wavelength converting layer 16). The surface tension of the film is more preferably at least 0.04 N/m.

By treating the surface, oxygen functional groups and/or nitrogen functional groups are introduced onto the surface of the base film layer 12 (ultraviolet blocking layer 14), chemical bonds are formed between functional groups on the surface of the film and the oxygen functional groups (such as hydroxy groups or carboxyl groups) of the resin of the resin varnish or the curing agent. As a result, the adhesion between the base film layer 12 (ultraviolet blocking layer 14) and the coating layer 18 (the wavelength converting layer 16) is improved.

Embodiment 3

Figure 3:
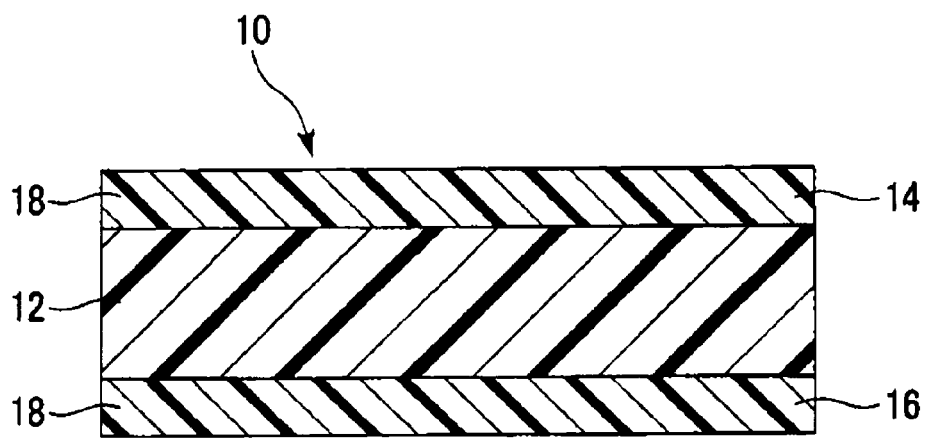
FIG. 3 is a cross-sectional view illustrating another embodiment of the wavelength conversion film of the present invention.

FIG. 3 is a cross-sectional view illustrating another embodiment of the wavelength conversion film of the present invention.

The wavelength converting film 10 consists of a base film layer 12 containing a thermoplastic resin and two coating layers 18 containing a resin, which are formed on the both sides of the base film layer 12.
(Base Film Layer)

The base film layer 12 is a layer formed by melting a material containing a thermoplastic resin.

The base film layer 12 does not contain an inorganic ultraviolet blocking material or a wavelength converting material.

The thermoplastic resin may be the thermoplastic resin exemplified in Embodiment 1.

The thickness of the base film layer 12 is preferably from 20 to 150 μm, more preferably from 50 to 100 μm.
(Coating Layer)

The coating layers 18 are layers formed by applying a resin varnish on the surfaces of the base film layer 12.

One of the two coating layers 18 is also an ultraviolet blocking layer 14 which contains an inorganic ultraviolet blocking material, and the other is also a wavelength converting layer 16 which contains a wavelength converting material.

The resin may be the resin exemplified in Embodiment 2.

The resin in the ultraviolet blocking layer 14 and the resin in the wavelength converting layer 16 may be the same or different.
(Ultraviolet Blocking Layer)

The ultraviolet blocking layer 14 is a coating layer 18 containing an inorganic ultraviolet blocking material, that is, a layer formed by applying a resin varnish containing an inorganic ultraviolet blocking material on one side of the surface of the base film layer 12.

The inorganic ultraviolet blocking material may be the inorganic ultraviolet blocking material exemplified in Embodiment 1.

The content of the inorganic ultraviolet blocking material is preferably in the same range as in Embodiment 1.

The thickness of the ultraviolet blocking layer 14 is preferably in the same range as the wavelength converting layer 16 in Embodiment 2.
(Wavelength Converting Layer)

The wavelength converting layer 16 is a coating layer 18 containing a wavelength converting material, that is, a layer formed by applying a resin varnish containing a wavelength converting material on the other side of the surface of the base film layer 12.

The wavelength converting material may be the wavelength converting material exemplified in Embodiment 1.

The content of the wavelength converting material is preferably in the same range as in Embodiment 1.

The thickness of the wavelength converting layer 16 is preferably in the same range as in Embodiment 2.
(Method for Producing Wavelength Conversion Film)

The wavelength conversion film 10 is produced by the same method as in Embodiment 2.

In particular, the resin of the resin varnish used for forming the ultraviolet blocking layer 14 is preferably a fluororesin.

Embodiment 4

Figure 4:
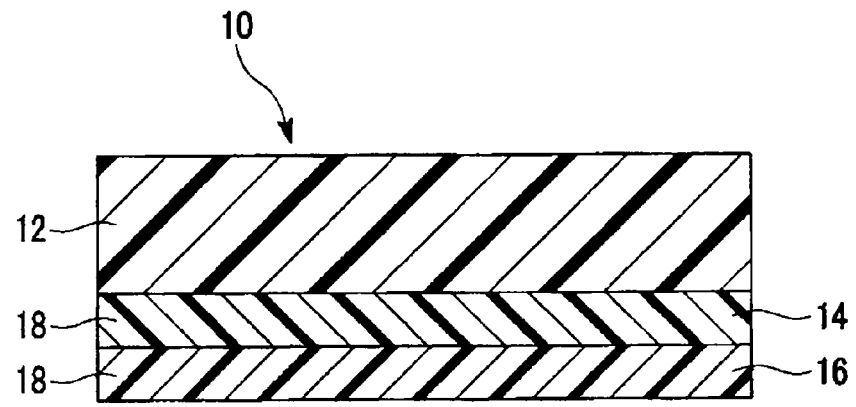
FIG. 4 is a cross-sectional view illustrating another embodiment of the wavelength conversion film of the present invention.

FIG. 4 is a cross-sectional view illustrating another embodiment of the wavelength conversion film of the present invention. The wavelength conversion film 10 consists of a base film layer 12 containing a thermoplastic resin and two coating layers 18 containing a resin, formed on one side of the base film layer 12.
(Base Film Layer)

The base film layer 12 is a layer formed by melting a material containing a thermoplastic resin.

The base film layer 12 does not contain an inorganic ultraviolet blocking material or a wavelength converting material.

The thermoplastic resin may be the thermoplastic resin exemplified in Embodiment 1.

The thickness of the base film layer 12 is preferably from 20 to 150 μm, more preferably from 50 to 100 μm.
(Coating Layer)

The coating layers 18 are layers formed by applying a resin varnish on the surfaces of the base film layer 12 or the coating layer 18.

One of the two coating layers 18 is also an ultraviolet blocking layer 14 which contains an inorganic ultraviolet blocking material, and the other is also a wavelength converting layer 16 which contains a wavelength converting material.

The resin may be the resin exemplified in Embodiment 2.

The resin in the ultraviolet blocking layer 14 and the resin in the wavelength converting layer 16 may be the same or different.
(Ultraviolet Blocking Layer)

The ultraviolet blocking layer 14 is a coating layer 18 containing an inorganic ultraviolet blocking material, that is, a layer formed by applying a resin varnish containing an inorganic ultraviolet blocking material on one side of the surface of the base film layer 12.

The inorganic ultraviolet blocking material may be the inorganic ultraviolet blocking material exemplified in Embodiment 1.

The content of the inorganic ultraviolet blocking material is preferably in the same range as in Embodiment 1.

The thickness of the ultraviolet blocking layer 14 is preferably in the same range as the wavelength converting layer 16 in Embodiment 2.
(Wavelength Converting Layer)

The wavelength converting layer 16 is a coating layer 18 containing a wavelength converting material, that is, a layer formed by applying a resin varnish containing a wavelength converting material on the surface of the ultraviolet blocking layer 14.

The wavelength converting material may be the wavelength converting material exemplified in Embodiment 1.

The content of the wavelength converting material is preferably in the same range as in Embodiment 1.

The thickness of the wavelength converting layer 16 is preferably in the same range as in Embodiment 2.

(Method for Producing Wavelength Conversion Film)

The wavelength conversion film 10 is produced by the same method as in Embodiment 2.

In particular, the resin of the resin varnish used for forming the ultraviolet blocking layer 14 is preferably a fluororesin.

Embodiment 5

Figure 5:
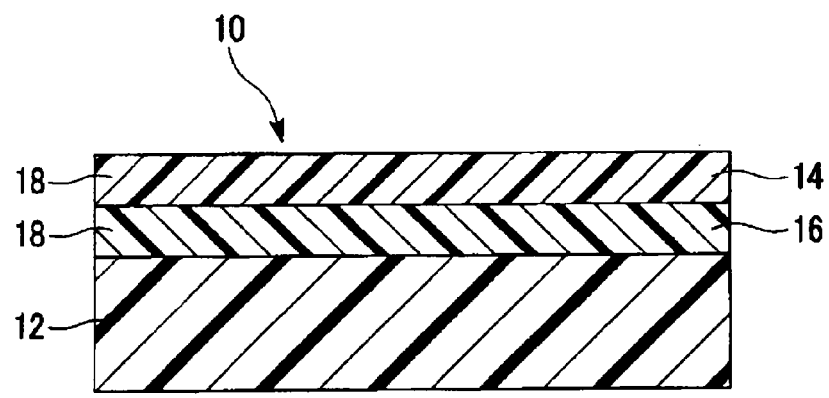
FIG. 5 is a cross-sectional view illustrating another embodiment of the wavelength conversion film of the present invention.

FIG. 5 is a cross-sectional view illustrating another embodiment of the wavelength conversion film of the present invention. The wavelength conversion film 10 consists of a base film layer 12 containing a fluororesin and two coating layers 18 containing a resin, formed on one side of the base film layer 12.

(Base Film Layer)

The base film layer 12 is a layer formed by melting a material containing a thermoplastic resin.

The base film layer 12 does not contain an inorganic ultraviolet blocking material or a wavelength converting material.

The thermoplastic resin may be the thermoplastic resin exemplified in Embodiment 1.

The thickness of the base film layer 12 is preferably from 20 to 150 μm, more preferably from 50 to 100 μm.

(Coating Layer)

The coating layers 18 are layers formed by applying a resin varnish on the surfaces of the base film layer 12 or the coating layer 18.

One of the two coating layers 18 is also a wavelength converting layer 16 which contains a wavelength converting material, and the other is also an ultraviolet blocking layer 14 which contains an inorganic ultraviolet blocking material.

The resin may be the resin exemplified in Embodiment 2.

The resin in the ultraviolet blocking layer 14 and the resin in the wavelength converting layer 16 may be the same or different.

(Wavelength Converting Layer)

The wavelength converting layer 16 is a coating layer 18 containing a wavelength converting material, that is, a layer formed by applying a resin varnish containing a wavelength converting material on one side of the surface of the base film layer 12.

The wavelength converting material may be the wavelength converting material exemplified in Embodiment 1.

The content of the wavelength converting material is preferably in the same range as in Embodiment 1.

The thickness of the wavelength converting layer 16 is preferably in the same range as in Embodiment 2.

(Ultraviolet Blocking Layer)

The ultraviolet blocking layer 14 is a coating layer 18 containing an inorganic ultraviolet blocking material, that is, a layer formed by applying a resin varnish containing an inorganic ultraviolet blocking material on the surface of the wavelength converting layer 16.

The inorganic ultraviolet blocking material may be the inorganic ultraviolet blocking material exemplified in Embodiment 1.

The content of the inorganic ultraviolet blocking material is preferably in the same range as in Embodiment 1.

The thickness of the ultraviolet blocking layer 14 is preferably in the same range as the wavelength converting layer 16 in Embodiment 2.

(Method for Producing Wavelength Conversion Film)

The wavelength conversion film 10 is produced by the same method as in Embodiment 2.

In particular, the resin of the resin varnish used for forming the ultraviolet blocking layer 14 is preferably a fluororesin.

Embodiment 6

Figure 6:
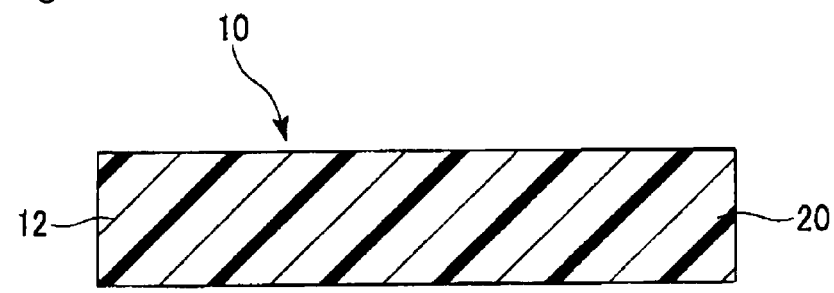
FIG. 6 is a cross-sectional view illustrating another embodiment of the wavelength conversion film of the present invention.

FIG. 6 is a cross-sectional view illustrating another embodiment of the wavelength conversion film of the present invention. The wavelength conversion film 10 consists of a base film layer 12 containing a thermoplastic resin.

(Base Film Layer)

The base film layer 12 is a layer formed by melting a material containing a thermoplastic resin.

The base film layer 12 is also a wavelength converting/ultraviolet blocking layer 20 which contains an inorganic ultraviolet blocking material and a wavelength converting material.

The thermoplastic resin may be the thermoplastic resin exemplified in Embodiment 1.

(Wavelength Converting/Ultraviolet Blocking Layer)

The wavelength converting/ultraviolet blocking layer 20 is a base film layer 12 which contains an inorganic ultraviolet blocking material and a wavelength converting material, that is, a layer formed by melting a material containing a thermoplastic resin, an inorganic ultraviolet blocking material and a wavelength converting material.

The inorganic ultraviolet blocking material may be the ultraviolet blocking material exemplified in Embodiment 1.

The content of the inorganic ultraviolet blocking material is preferably in the same range as in Embodiment 1.

The wavelength converting material may be the wavelength converting material exemplified in Embodiment 1.

The content of the wavelength converting material is preferably in the same range as in Embodiment 1.

The thickness of the wavelength conversion film 10 is preferably from 40 to 150 μm, more preferably from 50 to 100 μm.

The visible light transmittance of the wavelength conversion film 10 is preferably at least 65%, more preferably at least 70%. When the visible light transmittance of the wavelength conversion film 10 is at least 65, the light intensity after conversion of the wavelength is sufficiently high.

The ultraviolet transmittance of the wavelength conversion film 10 is preferably at most 40%, more preferably at most 30%.

(Method for Producing Wavelength Conversion Film)

The wavelength conversion film 10 is produced by melt forming a material containing a fluororesin, an inorganic ultraviolet blocking material and a wavelength converting material.

Embodiment 7

Figure 7:
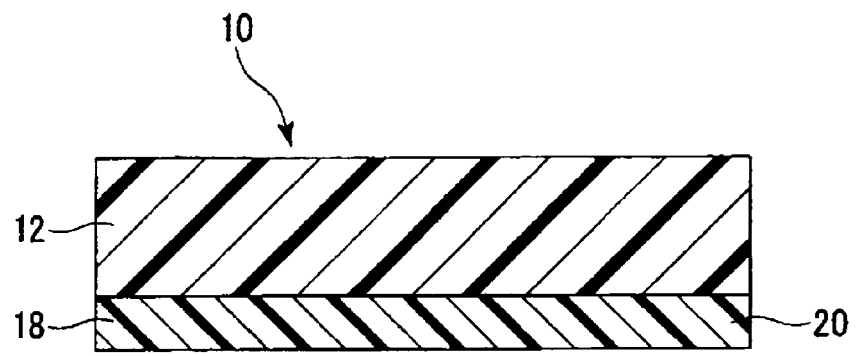
FIG. 7 is a cross-sectional view illustrating another embodiment of the wavelength conversion film of the present invention.

FIG. 7 is a cross-sectional view illustrating another embodiment of the wavelength conversion film of the present invention. The wavelength conversion film 10 consists of a base film layer 12 containing a fluororesin and a coating layer 18 containing a resin, formed on the surface of the base film layer 12.

(Base Film Layer)

The base film layer 12 is a layer formed by melting a material containing a thermoplastic resin.

The base film layer 12 does not contain an inorganic ultraviolet blocking material or a wavelength converting material.

The thermoplastic resin may be the thermoplastic resin exemplified in Embodiment 1.

The thickness of the base film layer 12 is preferably from 40 to 150 μm, more preferably from 50 to 100 μm.
(Coating Layer)

The coating layer 18 is a layer formed by applying a resin varnish on the surface of the base film layer 12.

The coating layer 18 is also a wavelength converting/ultraviolet blocking layer 20 which contains an inorganic ultraviolet blocking material and a wavelength converting material.

The resin may be the resin exemplified in Embodiment 2.
(Wavelength Converting/Ultraviolet Blocking Layer)

The wavelength converting/ultraviolet blocking layer 20 is a coating layer 18 containing an inorganic ultraviolet blocking material and a wavelength converting material, that is, a layer formed by applying a resin varnish containing an inorganic ultraviolet blocking material and a wavelength converting material on the surface of the base film layer 12.

The inorganic ultraviolet blocking material may be the ultraviolet blocking material exemplified in Embodiment 1.

The content of the inorganic ultraviolet blocking material is preferably in the same range as in Embodiment 1.

The wavelength converting material may be the wavelength converting material exemplified in Embodiment 1.

The content of the wavelength converting material is preferably in the same range as in Embodiment 1.

The thickness of the wavelength converting/ultraviolet blocking layer 20 is preferably from 1 to 50 μm, more preferably from 2 to 20 μm.

The visible light transmittance of the wavelength conversion film 10 is preferably in the same range as in Embodiment 6. The ultraviolet transmittance of the wavelength conversion film 10 is preferably in the same range as in Embodiment 6.
(Method for Producing Wavelength Conversion Film)

The wavelength conversion film 10 is produced by the same method as in Embodiment 2.

Embodiment 8

Figure 8:
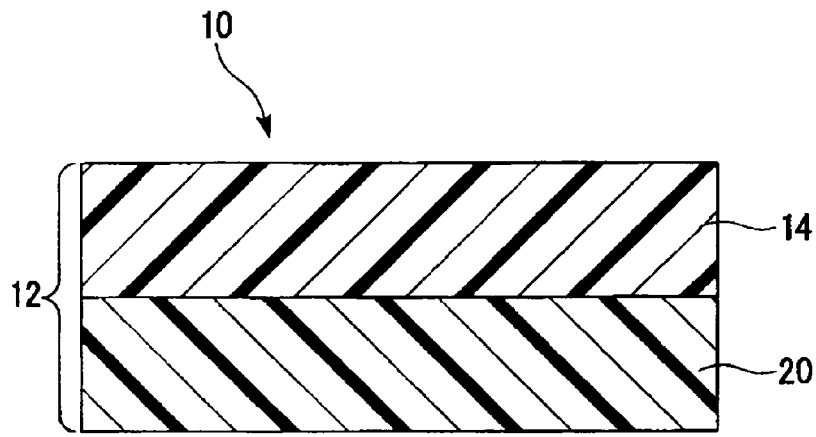
FIG. 8 is a cross-sectional view illustrating another embodiment of the wavelength conversion film of the present invention.

FIG. 8 is a cross-sectional view illustrating another embodiment of the wavelength conversion film of the present invention. The wavelength conversion film 10 consists of two base film layers 12 containing a thermoplastic resin.
(Base Film Layer)

The base film layer 12 is a layer formed by melting a material containing a thermoplastic resin.

One of the two base film layers 12 is also an ultraviolet blocking layer 14 which contains an inorganic ultraviolet blocking material, and the other is a wavelength converting/ultraviolet blocking layer 20 which contains an inorganic ultraviolet blocking material and a wavelength converting material.

The thermoplastic resin may be the thermoplastic resin exemplified in Embodiment 1.

The thermoplastic resin in the ultraviolet blocking layer 14 and the thermoplastic resin in the wavelength converting/ultraviolet blocking layer 20 may be the same or different.
(Ultraviolet Blocking Layer)

The ultraviolet blocking layer 14 is a base film layer 12 which contains an inorganic ultraviolet blocking material, that is, a layer formed by melting a material containing a thermoplastic resin and an inorganic ultraviolet blocking material.

The inorganic ultraviolet blocking material may be the ultraviolet blocking material exemplified in Embodiment 1.

The content of the inorganic ultraviolet blocking material is preferably in the same range as in Embodiment 1.

The thickness of the ultraviolet blocking layer 14 is preferably from 6 to 250 μm, more preferably from 10 to 150 μm.
(Wavelength Converting/Ultraviolet Blocking Layer)

The wavelength converting/ultraviolet blocking layer 20 is a base film layer 12 which contains an inorganic ultraviolet blocking material and a wavelength converting material, that is, a layer formed by melting a material containing a thermoplastic resin, an inorganic ultraviolet blocking material and a wavelength converting material.

The inorganic ultraviolet blocking material may be the ultraviolet blocking material exemplified in Embodiment 1.

The content of the inorganic ultraviolet blocking material is preferably in the same range as in Embodiment 1.

The wavelength converting material may be the wavelength converting material exemplified in Embodiment 1.

The content of the wavelength converting material is preferably in the same range as in Embodiment 1.

The thickness of the wavelength converting/ultraviolet blocking layer 20 is preferably from 40 to 300 μm, more preferably from 50 to 100 μm.

The visible light transmittance of the wavelength conversion film 10 is preferably in the same range as in Embodiment 6. The ultraviolet transmittance of the wavelength conversion film 10 is preferably in the same range as in Embodiment 6.
(Method for Producing Wavelength Conversion Film)

The wavelength conversion film 10 is produced by the same method as in Embodiment 1.

Embodiment 9

Figure 9:
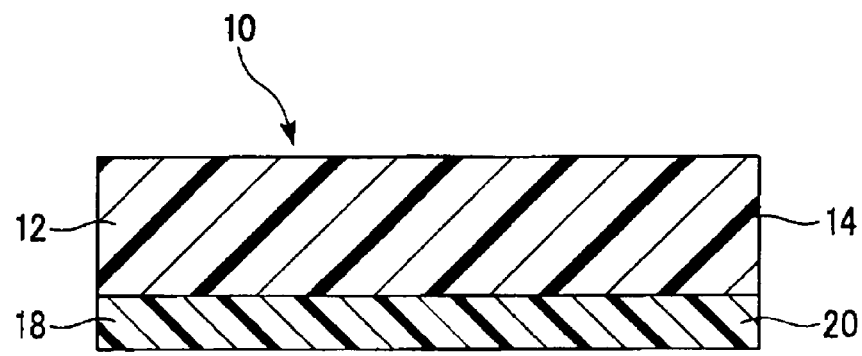
FIG. 9 is a cross-sectional view illustrating another embodiment of the wavelength conversion film of the present invention.

FIG. 9 is a cross-sectional view illustrating another embodiment of the wavelength conversion film of the present invention. The wavelength conversion film 10 consists of a base film layer 12 containing a fluororesin and a coating layer 18 containing a resin, formed on the surface of the base film layer 12.
(Base Film Layer)

The base film layer 12 is a layer formed by melting a material containing a thermoplastic resin.

The base film layer 12 is also an ultraviolet blocking layer 14 which contains an inorganic ultraviolet blocking material.

The thermoplastic resin may be the thermoplastic resin exemplified in Embodiment 1.
(Ultraviolet Blocking Layer)

The ultraviolet blocking layer 14 is a base film layer 12 which contains an inorganic ultraviolet blocking material, that is, a layer formed by melting a material containing a thermoplastic resin and an inorganic ultraviolet blocking material.

The inorganic ultraviolet blocking material may be the ultraviolet blocking material exemplified in Embodiment 1.

The content of the inorganic ultraviolet blocking material is preferably in the same range as in Embodiment 1.

The thickness of the ultraviolet blocking layer 14 is preferably from 6 to 250 μm, more preferably from 10 to 150 μm.
(Coating Layer)

The coating layer 18 is a layer formed by applying a resin varnish on the surface of the base film layer 12.

The coating layer 18 is also a wavelength converting/ultraviolet blocking layer 20 which contains an inorganic ultraviolet blocking material and a wavelength converting material.

The resin may be the resin exemplified in Embodiment 2.
(Wavelength Converting/Ultraviolet Blocking Layer)

The wavelength converting/ultraviolet blocking layer 20 is a coating layer 18 containing an inorganic ultraviolet blocking material and a wavelength converting material, that is, a layer formed by applying a resin varnish containing an inorganic ultraviolet blocking material and a wavelength converting material on the surface of the base film layer 12.

The inorganic ultraviolet blocking material may be the ultraviolet blocking material exemplified in Embodiment 1.

The content of the inorganic ultraviolet blocking material is preferably in the same range as in Embodiment 1.

The wavelength converting material may be the wavelength converting material exemplified in Embodiment 1.

The content of the wavelength converting material is preferably in the same range as in Embodiment 1.

The thickness of the wavelength converting/ultraviolet blocking layer 20 is preferably from 1 to 50 µm, more preferably from 2 to 20 µm.

The visible light transmittance of the wavelength conversion film 10 is preferably in the same range as in Embodiment 6. The ultraviolet transmittance of the wavelength conversion film 10 is preferably in the same range as in Embodiment 6.

(Method for Producing Wavelength Conversion Film)

The wavelength conversion film 10 is produced by the same method as in Embodiment 2.

With the wavelength conversion film 10 as described above, the optical wavelength converting function of can be maintained for a long term for the following reasons:

(i) The ultraviolet transmittance of the wavelength conversion film 10 is low because it contains an inorganic ultraviolet blocking material. As a result, the photolysis of the wavelength converting material by ultraviolet light is inhibited, and the wavelength converting function is maintained for a long term. By covering the surface of the metal oxide as an inorganic ultraviolet blocking material with silicon dioxide, its interactive property to the wavelength converting material becomes much smaller, and thus the wavelength converting function is maintained for much longer time;

(ii) The inorganic ultraviolet blocking material, unlike a conventional organic ultraviolet absorbent, does not affect the wavelength converting material. The reason is that when an organic wavelength converting material is used with an organic ultraviolet absorbing material, the content of the organic compound in the amorphous part of the resin becomes large, which is on the basis that when an organic compound is unevenly distributed in the thermoplastic resin, the more the content of the organic compound in the amorphous part of the resin is, the more easily it migrates.

And, because an inorganic ultraviolet blocking material has small interactive property to an organic wavelength converting material compared with an organic ultraviolet blocking material, when an inorganic ultraviolet blocking material is used, the wavelength converting function is maintained for a longer period than when an organic ultraviolet blocking material is used.

With a conventional organic ultraviolet absorbent, which is a low-molecular-weight organic compound, even when the organic ultraviolet absorbent and the wavelength converting material are contained separately in different layers, the organic ultraviolet absorbent migrates to a layer containing a wavelength converting material by the heat of the sunlight. The organic ultraviolet absorbent interacts with an organic wavelength converting material, and deteriorates the wavelength converting function of the wavelength converting material. So, even when the ultraviolet blocking layer and the wavelength converting layer are laminated, an inorganic ultraviolet blocking material is preferred as the ultraviolet blocking material used in the ultraviolet blocking layer.

(iii) If the base film layer 12 contains a fluororesin, its deterioration by the ultraviolet ray is little. Therefore, the visible light transmittance of the wavelength converting film 10 decreases little, and the light intensity after conversion of the wavelength decreases little as time passes. By contrast, with a non-fluororesin, compared with a fluororesin, even if mixed with an ultraviolet absorbent, its visible light transmission decreases as time passes, and then the light absorbed by the wavelength converting material decreases as time passes, and as a result, the light intensity after conversion of the light also decreases as time passes.

Regarding the wavelength converting film 10 as described above, when the base film layer 12 contains a fluororesin, the visible light transmittance of the wavelength conversion film 10 is high. Therefore, the light after converting the wavelength is less likely to be absorbed by the wavelength conversion film 10. As a result, the light intensity after conversion of the wavelength becomes high as compared with the conventional wavelength conversion film. Specifically, the light intensity after conversion of the wavelength is higher than the light intensity with the wavelength in the sunlight before incidence.

When the wavelength converting film 10 as described above has an ultraviolet blocking layer 14 containing an inorganic ultraviolet blocking material and a wavelength converting layer 16 containing a wavelength converting material, by disposing the ultraviolet blocking layer 14 on the sunlight incoming side compared with the wavelength converting layer 16, the amount of ultraviolet light reaching the wavelength converting layer 16 can be decreased substantially. As a result, the optical wavelength converting function is maintained for further longer time.

When the ultraviolet blocking layer 14 contains a fluororesin, the amount of the ultraviolet ray in the light reaching the wavelength converting layer 16 through the ultraviolet blocking layer 14 is at most 50% compared with the ultraviolet ray in the sunlight. That is because the resin used in the wavelength converting layer 16 may be a non-fluororesin. However, the resin used in the wavelength converting layer 16 is also preferably a fluororesin for the following reasons:

(i) Pollens, oils, etc. are less likely to attach to the wavelength converting layer 16, and thus the visible light transmittance of the wavelength conversion film 10 is less likely to be low;

(ii) A fluororesin has high durability, and thus the wavelength converting function is maintained for a long term; and (iii) A water/oil repellent fluororesin has low compatibility with the wavelength converting material, and the wavelength converting material aggregates without completely finely dispersed, which results in high emission intensity. In addition, absorbed or emitted light is scarcely absorbed by the fluororesin. So with a fluororesin, the emission spectrum and the emission intensity of the wavelength converting material becomes high as compared with other resins.

<Coating Film Forming Composition>

The coating film forming composition of the present invention contains a wavelength converting material, an inorganic ultraviolet blocking material, a resin and a liquid medium.

The inorganic ultraviolet blocking material may be the inorganic ultraviolet blocking material exemplified in Embodiment 1.

The content of the inorganic ultraviolet blocking material is preferably in the same range as in Embodiment 1.

The wavelength converting material may be the wavelength converting material exemplified in Embodiment 1.

The content of the wavelength converting material is preferably in the same range as in Embodiment 1.

The resin may be the resin exemplified in Embodiment 2.

The liquid medium may, for example, be an organic solvent or water.

The coating film forming composition is used for forming the coating layer 18 (the wavelength converting/ultraviolet blocking layer 20) of the wavelength conversion film 10.

With the coating layer 18 formed by using the coating film forming composition of the present invention, bleeding out of the wavelength converting material is inhibited. By contrast, with the combination of an organic ultraviolet absorbent and a wavelength converting material, the wavelength converting material bleeds out.

<Agricultural Film>

The agricultural film of the present invention is made from the wavelength conversion film of the present invention. The wavelength conversion film of the present invention absorbs light having a specific range of wavelength in the sunlight, and emits light having different wavelength depending on types of plants, which is effective for plant growth. Thus, it is ideal for an agricultural film for greenhouse, etc. Usage of the agricultural film of the present invention may, for example, be a roofing material for a greenhouse, a curtain hung in a greenhouse or a material for a tunnel. The agricultural film of the present invention may be used with glass attached thereon. When it is used as a roofing material for a greenhouse which has a double layered structure, it may be used as inner film on the side of plants, or outer film on the side of outside air.

The agricultural film of the present invention may be used in any shape so long as it is possible to be applied to greenhouse farming or gardening. The film may be cut to pieces and weaved to be formed into a net or a fabric.

As the agricultural film of the present invention, the wavelength conversion film of the present invention is preferred in that the intensity of the transmitted light (the light intensity after conversion) is higher than the intensity of incoming sunlight with at least a part of wavelength in a range of 400 to 700 nm.

That is, in the range of the wavelength of the sunlight (300 nm to 2,500 nm), the wavelength of visible light, which is from 400 to 700 nm, is considered to be indispensable for growth of plants. The range of wavelength of light after wavelength conversion can be adjusted by appropriately selecting the wavelength converting material.

As the light influencing the growth of plants, the followings are reported:

red light (with a wavelength around 660 nm), which promotes germination or rooting;

far-red light (with a wavelength around 730 nm), which inhibits germination or rooting;

near-ultraviolet light (with a wavelength around 370 nm to 380 nm), which inhibits hypocotyl elongation;

blue light (with a wavelength around 440 nm to 480 nm), which brings phototropism;

far-red light (with a wavelength around 730 nm), which promotes petiole elongation;

light with a wavelength of 636 nm or around 650 nm, which promotes greening (chlorophyll biosynthesis);

light with a wavelength of 430 nm or around 670 nm (maximum wavelength), which promotes growth (photosynthesis);

red and far-red light, which is influential over photoperiodism of short-day or long-day and promotes flowering; and ultraviolet light, which changes the color of a fruit or a flower by increasing a phenolic pigment or an anthocyanin pigment.

The intensity of light is represented by photosynthetically active radiation (PAR). That is, the relation between photosynthesis and energy from sunlight should be discussed not in terms of intensity but in terms of PAR. PAR is the value of integral of spectral radiant energy (spectral irradiance) of each wavelength from 400 to 700 nm, which is the wavelength of visible light.

From the viewpoint of promotion of growth of plants, PAR of the transmitted light through the agricultural film of the present invention is necessarily at least 10% of the PAR of the sunlight in each three range of from 400 to 500 nm, from 500 to 600 nm and from 600 to 700 nm.

When the wavelength converting layer 16 is formed by coating, PAR can be adjusted by changing the coated area.

When the wavelength converting material 16 is formed on a part of the surface of the base film layer 12, PAR of the wavelength conversion film 10 is calculated by the following formula (2):

$$\text{PAR of the wavelength conversion film 10} = (\text{PAR of the light transmitted through the part where the wavelength converting layer 16 is formed}) \times (\text{area ratio of the part where the wavelength converting layer 16 is formed}) + (\text{PAR of the light transmitted through the part where the wavelength converting layer 16 is not formed}) \times (\text{area ratio of the part where the wavelength converting layer 16 is not formed}) \quad (2)$$

Therefore, PAR of the light transmitted through the wavelength conversion film 10 can be optionally adjusted by properly setting the content of the wavelength converting material in the wavelength converting layer 16, the thickness of the wavelength converting layer 16 or the area of wavelength converting layer 16 properly.

The agricultural film of the present invention may be an agricultural film wherein a droplet flowing layer containing silica, alumina, etc. is formed on one side or on both sides of the wavelength conversion film.

Depending on the reflective index of the resin, from 60 to 80% of the light emitted by the wavelength converting material may be reflected on the interface between the agricultural film and air, and diffuse in the film. In many cases, the absorption spectrum of the wavelength converting material overlaps with its emission spectrum, and thus a part of the light in the film will be absorbed again by the wavelength converting material. In order to avoid this energy loss, and to let the light emitted by the wavelength converting material be radiated from the film effectively, an ingenious application may be attempted. Such application may, for example, be:

(i) to make the agricultural film contain an inorganic powder such as silica or alumina; or (ii) to form a regular concavo-convex pattern on the inner surface of the agricultural film, as described in JP-A-63-160520.

When the agricultural film of the present invention as described above, which has the wavelength converting function, is used for a greenhouse, further improvements of yield and quality of crops, adjustment of picking season, reducing the period of cultivation, etc. are accomplished.

<Cover Film for Photovoltaic Generation>

The wavelength conversion film of the present invention is also suitable for a cover film of panel for photovoltaic generation because it absorbs light having a specific range of wavelength in the sunlight, and it emits light having a different range of wavelength which is effective for photovoltaic generation.

<Sign Board>

The wavelength conversion film of the present invention has the wavelength converting function not only to the sunlight but also to an artificial light like a fluorescence, thus it can be used as a filter for a backlight sign board. When the wavelength conversion film of the present invention is used as a filter for a sign board, the signing part can be seen with lighting.

The thickness of the wavelength conversion film used as a filter of a sign board is preferably from 25 to 100 μm in order to maintain the light transmittance, and an optimal thickness depending on the structure of the sign board may be used.

<Structure>

The structure of the present invention is a structure using the wavelength conversion film (the agricultural film) as a roofing material or a wall covering material.

The structure may, for example, be a greenhouse or a tunnel.

When the wavelength conversion film consists of two or more layers, one of which is an ultraviolet blocking layer containing an inorganic ultraviolet blocking material and another of which is a wavelength converting layer containing a wavelength converting material, the wavelength conversion film is disposed so that the ultraviolet blocking layer is on the sunlight-incoming side.

When a resin film containing a wavelength converting material and not containing an inorganic ultraviolet blocking material and a resin film containing an inorganic ultraviolet blocking material are used in combination as a roofing material or a wall covering material, the resin film containing the inorganic ultraviolet blocking material is disposed on the sunlight-incoming side.

EXAMPLES

Now, the present invention will be described in detail with reference to Examples. It should be understood, however, that the present invention is by no means limited to these Examples.

Examples 1 to 6, 9 to 11, 15 and 18 are working examples of the present invention, and Examples 7, 8, 12 to 14, 16, 17 and 19 to 22 are comparative examples.

The evaluation methods are as follows.

(Visible Light Transmittance, Ultraviolet Transmittance)

With respect to the ultraviolet blocking layer film, the visible light transmittance and the ultraviolet transmittance were measured in accordance with JIS R3106 "Test method for transmittance, reflectance, emissivity, solar radiation heat acquiring efficiency of sheet glass" by using a spectrophotometer (UV-3100PC, manufactured by Shimadzu Corporation).

(Accelerated Weather Resistant Test)

With respect to the wavelength conversion film, a 5,000-hour weather resistant test was carried out by using a sunshine weather meter equipped with open-flame carbon-arc lamps in accordance with JIS K7350-4 (300 Sunshine weather meter, manufactured by Suga Test Instruments Co., Ltd.).

The accelerated weather resistant test was carried out by exposure, wherein the light entered from the ultraviolet blocking layer side of the film.

(Spectral Irradiance)

By using a visible-grating spectroradiometer (MS700, manufactured by Eko Instruments Co., Ltd.), (i) the spectral irradiance of the sunlight which did not transmit through a film, (ii) the spectral irradiance of the sunlight which transmitted through the wavelength conversion film without accelerated weather resistant test, and (iii) the spectral irradiance of the sunlight which transmitted through the wavelength conversion film after accelerated weather resistant test, were measured at the same time. The spectral irradiances for Examples 1 to 9 were measured at selected hours when the weather was stable on Feb. 5 and 6, 2007. The spectral irradiances for Examples 10 to 22 were measured at selected hours when the weather was stable on Nov. 13, 2007.

(Photosynthetically Active Radiation)

The photosynthetically active radiation (PAR) was calculated from the spectral irradiance of from 400 to 700 nm. The calculated PAR was divided into three parts of ranges of from 400 to 500 nm (blue), from 500 to 600 nm (green), and from 600 to 700 nm (red), and, in each range, the ratio of the PAR of the sunlight which transmitted through the wavelength conversion film without accelerated weather resistant test to the PAR of the sunlight which did not transmit through a film and the ratio of the PAR of the sunlight which transmitted through the wavelength conversion film after accelerated weather resistant test to the PAR of the sunlight which did not transmit through a film, were obtained.

Example 1

Production of Wavelength Converting Material 12 g of a perylene colorant (Lumogen F red 305, manufactured by BASF) and 100 g of ethanol were charged into a bead mill, and the colorant had dispersed in the ethanol to obtain a colorant dispersion.

10 g of tetraethoxysilane and 60 g of isopropanol were charged into a reactor, and 56 g of the colorant dispersion was dropped into the reactor over 10 minutes with stirring at room temperature, and then the mixture was continuously stirred to obtain a homogenous dispersion. Then, with stirring the dispersion in the reactor at room temperature, an aqueous solution of diethanolamine, which is a catalyst, was dropped into the reactor over a period of 30 minutes, followed by stirring for more 40 minutes for solution, and then by heating to 60° C. for gelation. After cooling the reactor, the reaction product was separated by filtration, washed by ethanol and water to remove the solvent, the dispersant and the catalyst, and dried at 120° C. for an hour. The obtained powder was milled by an impact mill for 10 seconds to obtain a powder having an average particle size of 1.5 μm.

The solubility of the perylene colorant, which was the starting material, was 7 g in 100 $cm^3$ of toluene, and 0.4 g in 1 L of distilled water. By contrast, the obtained powder was not dissolved in toluene or distilled water at all. Therefore, the obtained powder was confirmed to be covered by silica. The mass ratio of the perylene colorant to the silica (in $SiO_2$) (perylene colorant/silica) was 100/45.

10 g of the powder was dispersed in 30 g of an isopropanol solution wherein 5 mass % of phenyl methyl silicone oil was dissolved. Then, isopropanol was volatilized at 70° C., and then the powder was dried at 170° C. for an hour to obtain a powder wherein the surface of the silica was hydrophobized. The obtained powder was milled by an impact mill to obtain a wavelength converting material.

Production of Ultraviolet Blocking Material:

100 g of cerium oxide covered by silica (SC4060, manufactured by Nippon Denko) was dispersed in 300 g of an isopropanol solution wherein 5 mass % of phenyl methyl silicone oil was dissolved. Then, isopropanol was volatilized at 70° C., and then the powder was dried at 170° C. for an hour to obtain a powder wherein the surface of the silica was hydrophobized. The obtained powder was milled by an impact mill to obtain an ultraviolet blocking material.

Production of Ultraviolet Blocking Layer Film:

40 g of the inorganic ultraviolet blocking material and 4 kg of ETFE (FLUON ETFE88AXB, manufactured by Asahi Glass Company, Limited) were pelletized at 300° C. by a twin-screw extruder. The pellets were extrusion molded at 320° C. by a T-die to obtain an ultraviolet blocking layer film having a thickness of 100 μm.

Figure 10:
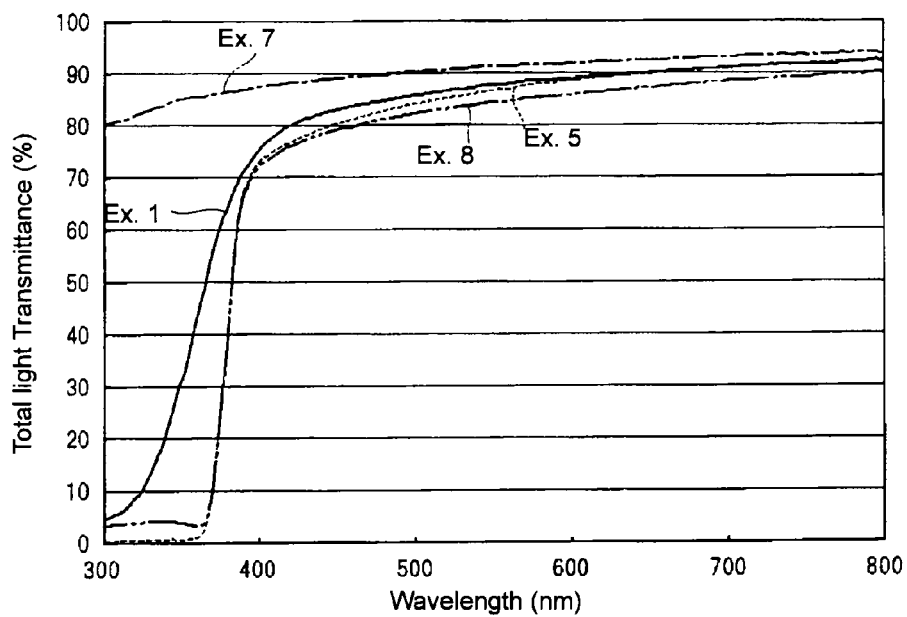
FIG. 10 is a chart showing the total light transmittance of the ultraviolet blocking layer film in Examples 1, 5, 7 and 8.

The visible light transmittance and the ultraviolet transmittance of the ultraviolet blocking layer film were measured. The results are shown in FIG. 10 and Table 1.

Production of Wavelength Conversion Film:

5 g of the wavelength converting material and 4 kg of ETFE (FLUON ETFE88AXB, manufactured by Asahi Glass Company, Limited) were pelletized at 300° C. by a twin-screw extruder. The pellets were extrusion molded at 320° C. by a T-die to obtain a wavelength converting layer film having a thickness of 100 μm, which was laid on the surface of the ultraviolet blocking layer film, and they were laminated to obtain a wavelength conversion film.

With respect to the wavelength conversion film, the accelerated weather resistant test was performed.

Figure 11:
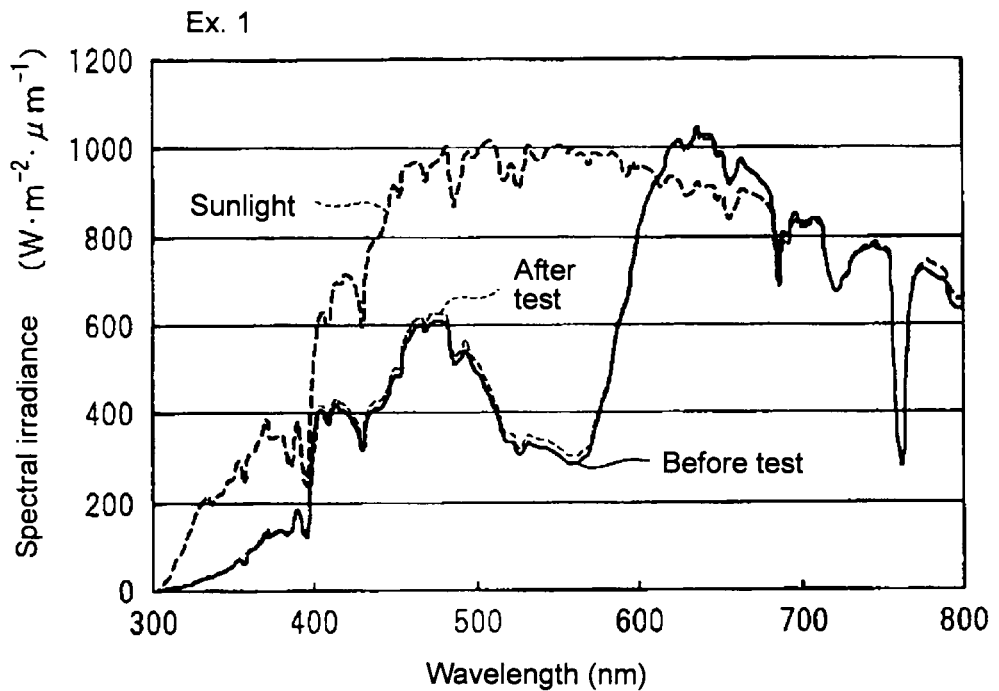
FIG. 11 is a spectral chart showing the spectral irradiances of sunlight and transmitted light through the wavelength conversion film in Example 1.

Then, (i) the spectral irradiance of the sunlight which did not transmit through a film, (ii) the spectral irradiance of the sunlight which transmitted through the wavelength conversion film kept without accelerated weather resistant test, and (iii) the spectral irradiance of the sunlight which transmitted through the wavelength conversion film after accelerated weather resistant test, were measured at the same time. The spectral chart of the spectral irradiances is shown in FIG. 11.

PAR was calculated from the spectral irradiances, and then the ratios of the PAR of the sunlight which transmitted through the wavelength conversion film before and after accelerated weather resistant test to the PAR of the natural sunlight were calculated. The results are shown in Table 1.

Compared to the natural sunlight, the PAR of the sunlight which transmitted through the wavelength conversion film is totally low, however, the PAR of a red light range of from 600 to 700 nm is higher than the natural sunlight. Additionally, the difference in the spectral irradiance between before and after the weather resistant test was slight.

Example 2

Production of Wavelength Conversion Film

The wavelength conversion film was obtained in the same manner as in Example 1, except that a perylene colorant (Lumogen F red 305, manufactured by BASF) not covered with silica was used as the wavelength converting material instead of the perylene colorant covered with silica.

Figure 12:
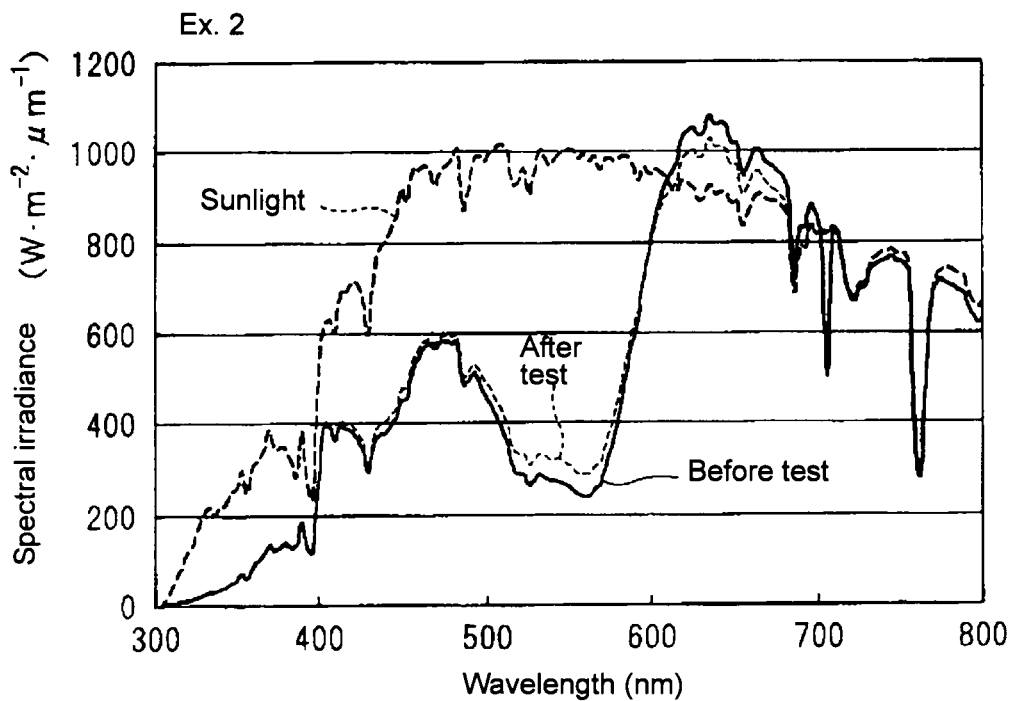
FIG. 12 is a spectral chart showing the spectral irradiances of sunlight and transmitted light through the wavelength conversion film in Example 2.

Measurements for the wavelength conversion film were carried out in the same manner as in Example 1. The results are shown in Table 1 and FIG. 12.

Example 3

Production of Wavelength Conversion Film 0.3 g of the wavelength converting material in Example 1 was dispersed in 40 g of a fluororesin varnish (LUMIFLON 600, manufactured by Asahi Glass Company, Limited, a xylene solution wherein a resin solid content is 50 mass %) to obtain a dispersion. The dispersion was applied on the surface of the ultraviolet blocking layer film in Example 1 so that the thickness of the coating after drying would be 10 μm, and dried to form the coating of the wavelength converting layer thereby to obtain a wavelength conversion film.

Figure 13:
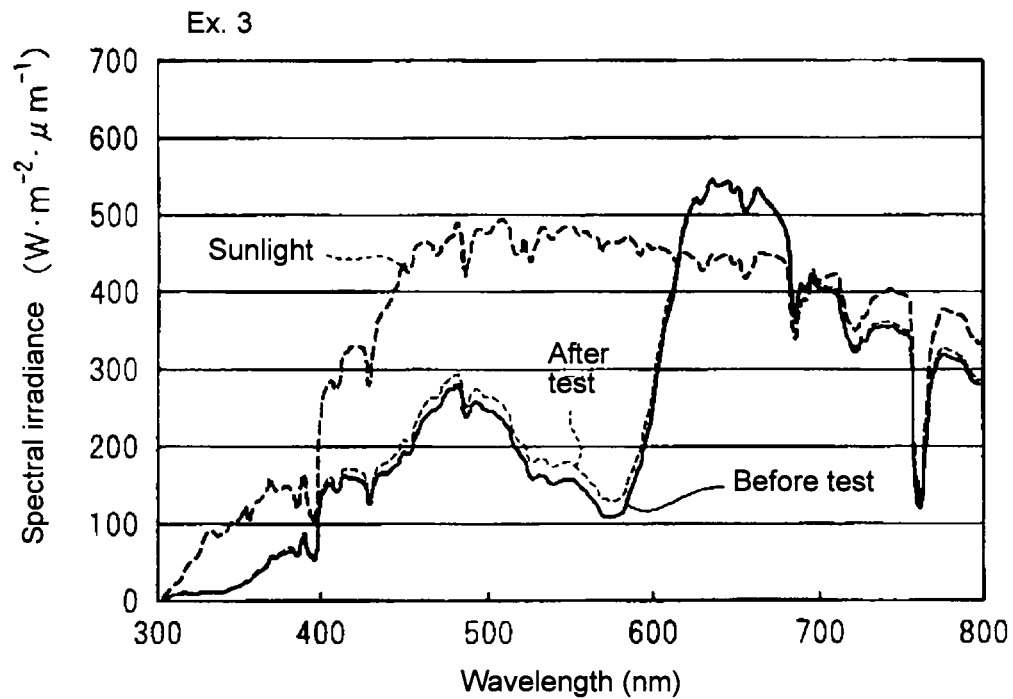
FIG. 13 is a spectral chart showing the spectral irradiances of sunlight and transmitted light through the wavelength conversion film in Example 3.

Measurements for the wavelength conversion film were carried out in the same manner as in Example 1. The results are shown in Table 1 and FIG. 13.

Example 4

Production of Wavelength Conversion Film 0.4 g of a perylene colorant (Lumogen F red 305, manufactured by BASF) was dispersed in 40 g of a fluororesin varnish (LUMIFLON 600, manufactured by Asahi Glass Company, Limited, a xylene solution wherein a resin solid content is 50 mass %) to obtain a dispersion. The dispersion was applied on the surface of the ultraviolet blocking layer film in Example 1 so that the thickness of the coating after drying would be 10 μm, and dried to form the coating of the wavelength converting layer thereby to obtain a wavelength conversion film.

Figure 14:
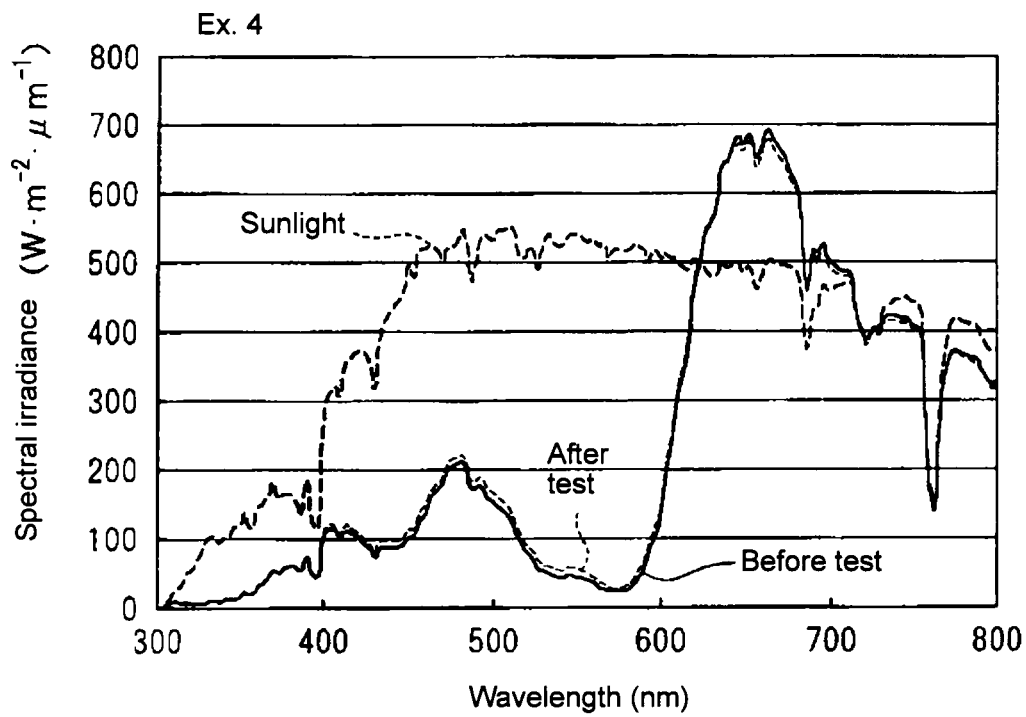
FIG. 14 is a spectral chart showing the spectral irradiances of sunlight and transmitted light through the wavelength conversion film in Example 4.

Measurements for the wavelength conversion film were carried out in the same manner as in Example 1. The results are shown in Table 1 and FIG. 14.

Example 5

Production of Inorganic Ultraviolet Blocking Material 100 g of zinc oxide covered with silica (Maxlight ZS32, manufactured by Showa Denko) was dispersed in 300 g of an isopropanol solution wherein 5 mass % of phenyl methyl silicone oil was dissolved. Then, isopropanol was volatilized at 70° C. and dried at 170° C. for an hour to obtain a powder wherein the surface of the silica was hydrophobized. The obtained powder was milled by an impact mill to obtain an inorganic ultraviolet blocking material.

Production of Ultraviolet Blocking Layer Film:

40 g of the inorganic ultraviolet blocking material and 4 kg of ETFE (FLUON ETFE88AXB, manufactured by Asahi Glass Company, Limited) were pelletized at 300° C. by a twin-screw extruder The pellets were extrusion molded at 320° C. by a T-die to obtain an ultraviolet blocking layer film having a thickness of 100 μm.

The visible light transmittance and the ultraviolet transmittance of the ultraviolet blocking layer film were measured. The results are shown in FIG. 10 and Table 1.

Production of Wavelength Conversion Film:

0.4 g of a perylene colorant (Lumogen F red 305, manufactured by BASF) was dispersed in 40 g of an acrylpolyol (referred to as APO in the tables) resin varnish (ACRYLET QT507-28, manufactured by TAISEI FINE CHEMICAL CO., LTD., solid content: 50 mass %, toluene: 25 mass %, butyl acetate: 25 mass %) to obtain a dispersion. The dispersion was applied on the surface of the ultraviolet blocking layer film so that the thickness of the coating after drying would be 10 μm, and dried to form the coating of the wavelength converting layer thereby to obtain a wavelength conversion film.

Figure 15:
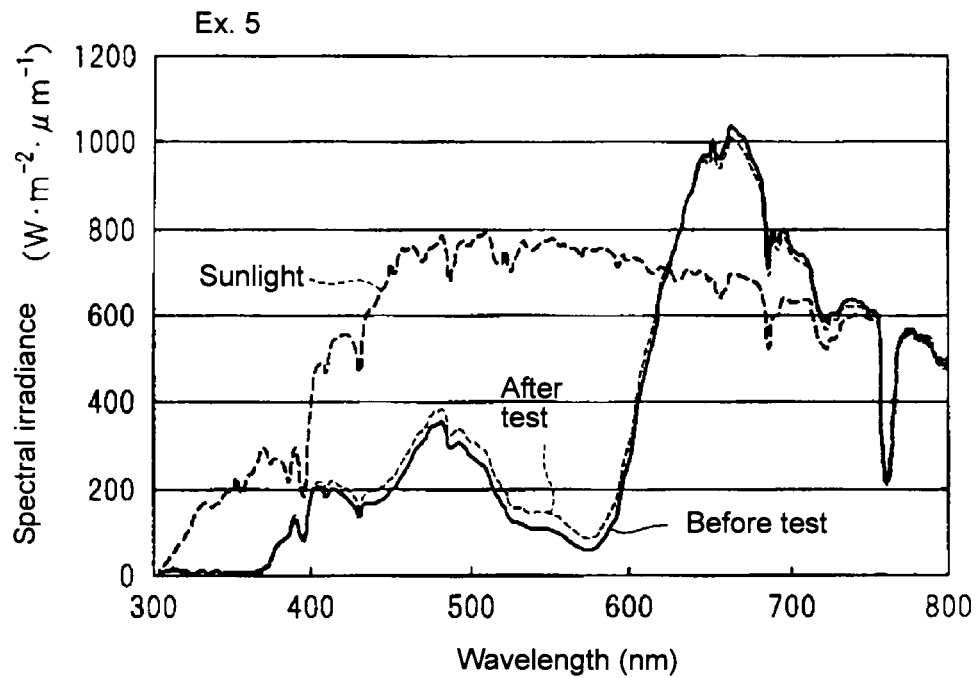
FIG. 15 is a spectral chart showing the spectral irradiances of sunlight and transmitted light through the wavelength conversion film in Example 5.

Measurements for the wavelength conversion film were carried out in the same manner as in Example 1. The results are shown in Table 1 and FIG. 15.

Example 6

Production of Ultraviolet Blocking Layer Film 40 g of the inorganic ultraviolet blocking material in Example 5 and 4 kg of PVDF (KUREHA KF polymer, manufactured by KUREHA CORPORATION) were pelletized at 280° C. by a twin-screw extruder. The pellets were extrusion molded at 300° C. by a T-die to obtain an ultraviolet blocking layer film having a thickness of 100 μm.

The visible light transmittance and the ultraviolet transmittance of the ultraviolet blocking layer film were measured. The results are shown in Table 1.

Production of Wavelength Conversion Film:

The wavelength conversion film was obtained in the same manner as in Example 5, except that the ultraviolet blocking layer film in Example 6 was used.

Measurements for the wavelength conversion film were carried out in the same manner as in Example 1. The results are shown in Table 1.

Example 7

Production of Base Film

A base film having a thickness of 100 μm was obtained in the same manner as the production of the ultraviolet blocking layer film in Example 1, except that an inorganic ultraviolet blocking material was not added.

The visible light transmittance and the ultraviolet transmittance of the base film were measured. The results are shown in FIG. 10 and Table 1.

Production of Wavelength Conversion Film:

The wavelength conversion film was obtained in the same manner as in Example 1, except that the base film in Example 7 was used instead of the ultraviolet blocking layer film in Example 1.

Figure 16:
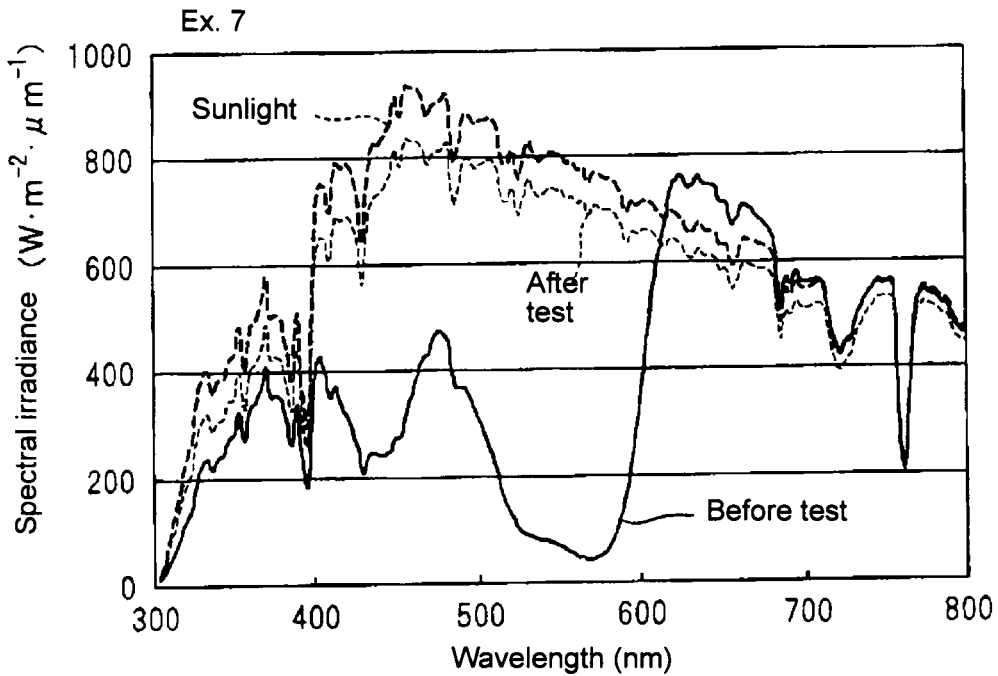
FIG. 16 is a spectral chart showing the spectral irradiances of sunlight and transmitted light through the wavelength conversion film in Example 7.

Measurements for the wavelength conversion film were carried out in the same manner as in Example 1. The results are shown in Table 1 and FIG. 16.

After the accelerated weather resistant test, PAR was increased, because the wavelength converting material was decomposed by the ultraviolet ray. It was substantially different from its initial wavelength conversion property.

Example 8

Production of Ultraviolet Blocking Layer Film 2.0 parts by mass of a organic ultraviolet absorbent (Bio-Sorb 910, manufactured by KYODO CHEMICAL CO., LTD.) and 100 parts by mass of EVA (EVAFLEX EV-450, manufactured by Du Pont-Mitsui Polychemicals Co., Ltd.) were kneaded by a heat roller set at 200° C. for 3 minutes, and then press molded by a hot press with a weight of 70 t and a temperature of 180° C. to obtain an ultraviolet blocking layer film having a thickness of 100 μm.

The visible light transmittance and the ultraviolet transmittance of the ultraviolet blocking layer film were measured. The results are shown in FIG. 10 and Table 1.

Production of Wavelength Conversion Film:

The surface of the ultraviolet blocking layer film was treated with corona discharge to get the wettability higher, and then coating of the wavelength converting layer was formed thereon in the same manner as in Example 4 to obtain a wavelength conversion film.

Measurements for the wavelength conversion film were carried out in the same manner as in Example 1. The results are shown in Table 1.

In each wavelength range, the ratio of the PAR of the sunlight which transmitted through the wavelength conversion film before accelerated weather resistant test to the PAR of the natural sunlight was at most 1. The PAR of the sunlight which transmitted through the wavelength conversion film after accelerated weather resistant test was substantially changed.

Example 9

Production of Single-Layered Fluororesin Film Containing Wavelength Converting Material and Ultraviolet Absorbing Material 0.5 g of the perylene colorant in Example 2 (Lumogen F red 305) was soaked in an isopropanol solution wherein 0.05 g of phenyl methyl silicone was dissolved, and then dried at 140° C. to obtain Lumogen F red 305 treated with 10% of phenyl methyl silicone therein.

Then, 40 g of zinc oxide covered with silica, treated with phenyl methyl silicone, which was obtained by the same operation as in Example 5, and 2 g of the above Lumogen F red 305, the surface of which was treated, were mixed into 4 kg of ETFE resin, and then, they were pelletized at 300° C. by a twin-screw extruder and extrusion molded at 320° C. to obtain a wavelength conversion film having a thickness of 100 μm.

Figure 17:
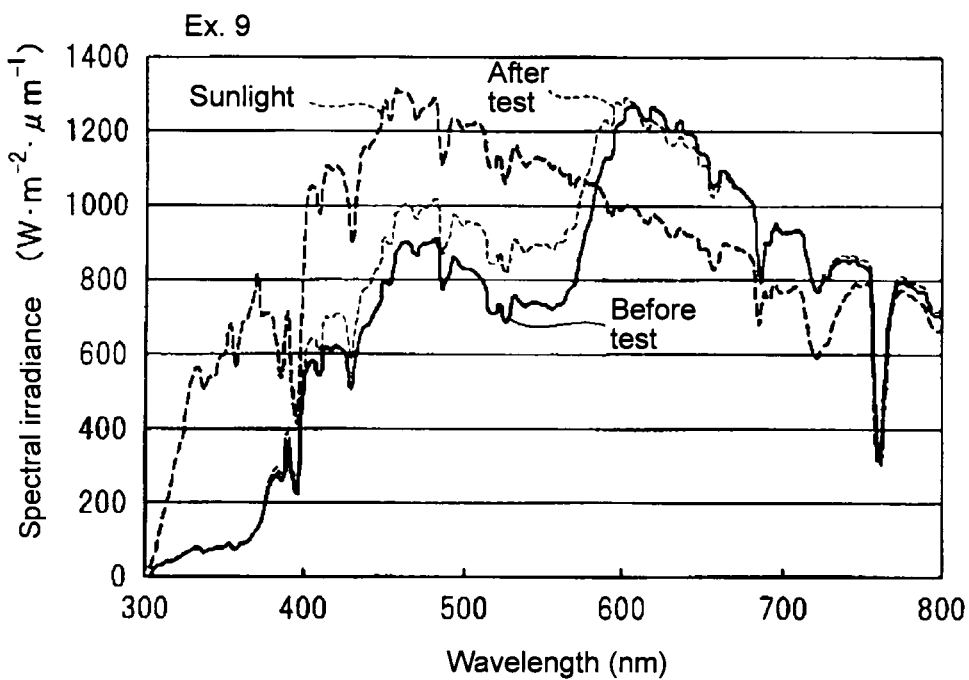
FIG. 17 is a spectral chart showing the spectral irradiances of sunlight and transmitted light through the wavelength conversion film in Example 9.

Measurements for the wavelength conversion film were carried out in the same manner as in Example 1. The results are shown in Table 1 and FIG. 17.

Before and after the accelerated weather resistant test, the spectral irradiance of the sunlight which transmitted through the wavelength conversion film changed, however, the ratio of the PAR in the range of from 600 to 700 nm of the sunlight which transmitted through the wavelength conversion film to the PAR of the natural sunlight changed just from 1.07 to 1.06, and thus it was proved that the wavelength conversion film had a sufficient wavelength converting function. So, the single-layered fluororesin film in this example is a single layered film having a wavelength converting layer and an ultraviolet absorbing layer in combination.

TABLE 1

| | | Ultraviolet blocking layer | | | Wavelength converting layer | | Wavelength conversion film | | | | | |
|---|---|---|---|---|---|---|---|---|---|---|---|---|
| | | | | | | | PAR ratio before accelerated resistance test (to sunlight) | | | PAR ratio after accelerated resistance test (to sunlight) | | |
| Ex. | Resin | Ultraviolet blocking material | Visible light transmittance (%) | Ultraviolet transmittance (%) | Resin | Wavelength Converting material | 400-500 nm | 500-600 nm | 600-700 nm | 400-500 nm | 500-600 nm | 600-700 nm |
| 1 | ETFE | Cerium oxide covered with silica | 87.9 | 36.3 | ETFE | Perylene colorant covered with silica | 0.58 | 0.42 | 1.06 | 0.59 | 0.43 | 1.05 |
| 2 | ETFE | Cerium oxide covered with silica | 87.9 | 36.3 | ETFE | Perylene colorant | 0.54 | 0.37 | 1.09 | 0.56 | 0.41 | 1.04 |

TABLE 1-continued

| | | Ultraviolet blocking layer | | | Wavelength converting layer | | Wavelength conversion film | | | | | |
| | | | | | | | PAR ratio before accelerated resistance test (to sunlight) | | | PAR ratio after accelerated resistance test (to sunlight) | | |
| Ex. | Resin | Ultraviolet blocking material | Visible light transmittance (%) | Ultraviolet transmittance (%) | Resin | Wavelength Converting material | 400-500 nm | 500-600 nm | 600-700 nm | 400-500 nm | 500-600 nm | 600-700 nm |
| --- | --- | --- | --- | --- | --- | --- | --- | --- | --- | --- | --- | --- |
| 3 | ETFE | Cerium oxide covered with silica | 87.9 | 36.3 | Fluororesin varnish | Perylene colorant covered with silica | 0.51 | 0.35 | 1.07 | 0.54 | 0.40 | 1.08 |
| 4 | ETFE | Cerium oxide covered with silica | 87.9 | 36.3 | Fluororesin varnish | Perylene colorant | 0.30 | 0.12 | 1.11 | 0.32 | 0.14 | 1.10 |
| 5 | ETFE | Zinc oxide covered with silica | 86.7 | 7.6 | APO resin varnish | Perylene colorant | 0.36 | 0.18 | 1.19 | 0.40 | 0.22 | 1.19 |
| 6 | PVDF | Zinc oxide covered with silica | 93.6 | 5.6 | APO resin varnish | Perylene colorant | 0.52 | 0.34 | 1.08 | 0.55 | 0.38 | 1.05 |
| 7 | ETFE | None | 92.1 | 85.1 | ETFE | Perylene colorant covered with silica | 0.42 | 0.16 | 1.02 | 0.89 | 0.91 | 0.93 |
| 8 | EVA | Organic ultraviolet absorbent | 84.4 | 9.4 | Fluororesin varnish | Perylene colorant | 0.54 | 0.33 | 0.98 | 0.70 | 0.72 | 0.78 |
| 9 | ETFE | | Zinc oxide covered with silica + Perylene colorant | | | | 0.71 | 0.71 | 1.08 | 0.81 | 0.82 | 1.07 |

Note)
APO: Acrylpolyol

Example 10

Production of Wavelength Converting Material 10 g of a perylene colorant (Lumogen F red 305, manufactured by BASF) was dispersed in 25 g of an isopropanol solution wherein 4 mass % of phenyl methyl silicone oil as dissolved. Then, isopropanol was volatilized at 70° C., and then it was dried at 170° C. for an hour to obtain a powder wherein the surface was hydrophobized. The obtained powder was milled by an impact mill to obtain a wavelength converting material.

Production of Inorganic Ultraviolet Blocking Material:

100 g of cerium oxide covered with silica (SC4060, manufactured by Nippon Denko) was dispersed in 300 g of an isopropanol solution wherein 5 mass % of phenyl methyl silicone oil as dissolved. Then, isopropanol was volatilized at 70° C., and then it was dried at 170° C. for an hour to obtain a powder wherein the surface of the silica was hydrophobized. The obtained powder was milled by an impact mill to obtain an inorganic ultraviolet blocking material.

Production of Wavelength Conversion Film:

40 g of the inorganic ultraviolet blocking material and 4 kg of ETFE were pelletized at 300° C. by a twin-screw extruder. 2 g of the wavelength converting material and 4 kg of ETFE were pelletized at 300° C. by a twin-screw extruder. The pellets were extrusion molded at 300° C. by a T-die to obtain an wavelength conversion film having a thickness of 100 μm.

The visible light transmittance and the ultraviolet transmittance of the wavelength conversion film were measured. The results are shown in Table 2. And, accelerated weather resistant test for the wavelength conversion film was carried out.

Figure 18:
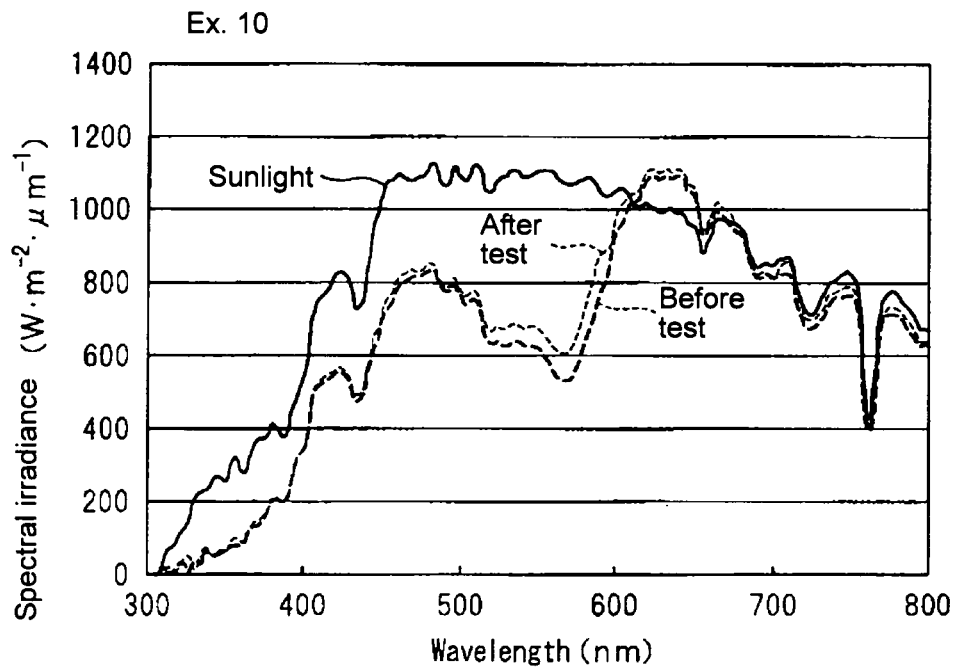
FIG. 18 is a spectral chart showing the spectral irradiances of sunlight and transmitted light through the wavelength conversion film in Example 10.

Then, (i) the spectral irradiance of the sunlight, (ii) the spectral irradiance of the sunlight which transmitted through the wavelength conversion film kept without accelerated weather resistant test, and (iii) the spectral irradiance of the sunlight which transmitted through the wavelength conversion film after accelerated weather resistant test, were measured at the same time. The spectral chart of the spectral irradiances is shown in FIG. 18.

PAR was calculated from the spectral irradiances, and then the ratios of the PAR of the sunlight which transmitted through the wavelength conversion film before and after accelerated weather resistant test to the PAR of the natural sunlight were calculated. The results are shown in Table 2.

Compared to the natural sunlight, the PAR of the sunlight which transmitted through the wavelength conversion film is totally low, however, the PAR of a red light range of from 600 to 700 nm is higher than the natural sunlight. Additionally, the difference in the spectral irradiance between before and after the weather resistant test was slight.

Example 11

Production of Wavelength Conversion Film

The wavelength conversion film was obtained in the same manner as in Example 10, except that the amount of the inorganic ultraviolet blocking material was 10 g.

Figure 19:
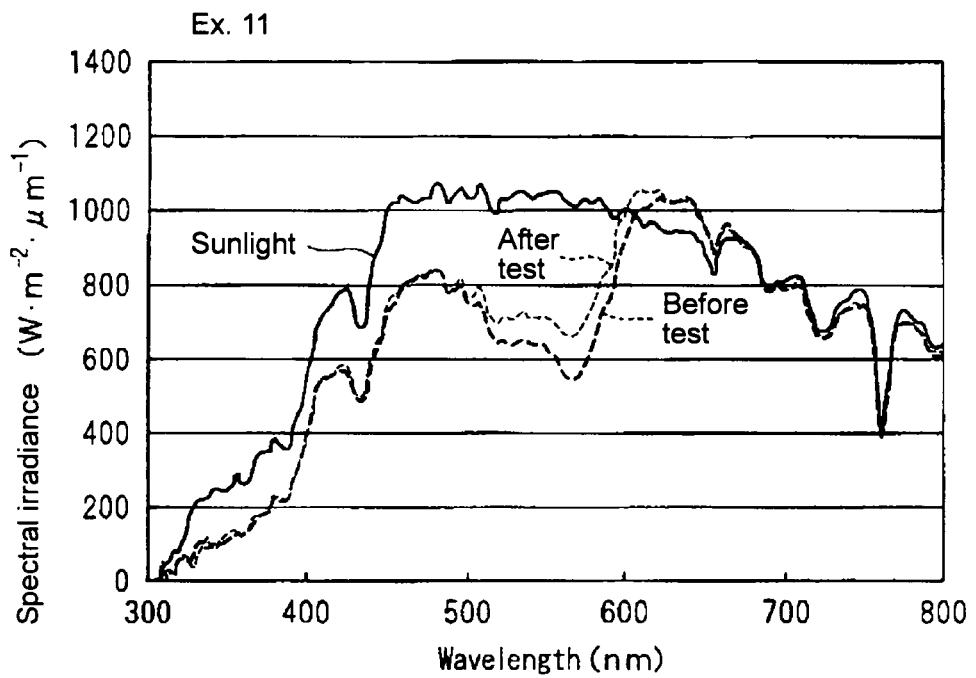
FIG. 19 is a spectral chart showing the spectral irradiances of sunlight and transmitted light through the wavelength conversion film in Example 11.

Measurements for the wavelength conversion film were carried out in the same manner as in Example 10. The results are shown in Table 2 and FIG. 19.

Example 12

Production of Wavelength Conversion Film

A benzophenone ultraviolet absorbent (CHIMASSORB 81/FL, manufactured by Chiba Japan), which is an organic ultraviolet blocking material, was used as the ultraviolet blocking material.

16 g of the organic ultraviolet blocking material and 4 kg of ETFE were pelletized at 300° C. by a twin-screw extruder. The obtained pellets and pellets containing the wavelength converting material, produced in the same manner as in Example 10, were extrusion molded at 200° C. by a T-die to obtain a wavelength conversion film having a thickness of 100 μm.

Measurements for the wavelength conversion film were carried out in the same manner as in Example 10. The results are shown in Table 2.

Example 13

Production of Wavelength Conversion Film

The wavelength conversion film was obtained in the same manner as in Example 12, except that the amount of the organic ultraviolet blocking material was 4 g.

Measurements for the wavelength conversion film were carried out in the same manner as in Example 10. The results are shown in Table 2.

Example 14

Production of Wavelength Conversion Film 8 g of the wavelength converting material in Example 10 and 8 kg of ETFE were pelletized at 300° C. by a twin-screw extruder. The pellets were extrusion molded at 200° C. by a T-die to obtain a wavelength conversion film having a thickness of 100 μm.

Measurements for the wavelength conversion film were carried out in the same manner as in Example 10. The results are shown in Table 2.

Example 15

Production of Wavelength Converting Material 100 g of SMARTLIGHT RL 1000 (manufactured by Chiba Japan) was dispersed in 250 g of an isopropanol solution wherein 4 mass % of phenyl methyl silicone oil was dissolved. Then, isopropanol was volatilized at 70° C. and dried at 170° C. for an hour to obtain a powder wherein the surface was hydrophobized. The obtained powder was milled by an impact mill to obtain a wavelength converting material.

Production of Wavelength Conversion Film:

80 g of the inorganic ultraviolet blocking material in Example 10 and 4 kg of linear low-density polyethylene (LLDPE) were pelletized at 180° C. by a twin-screw extruder. 80 g of the wavelength converting material in Example 15 and 4 kg of LLDPE were pelletized at 180° C. by a twin-screw extruder. The pellets were extrusion molded at 200° C. by a T-die to obtain an wavelength conversion film having a thickness of 100 μm.

Figure 20:
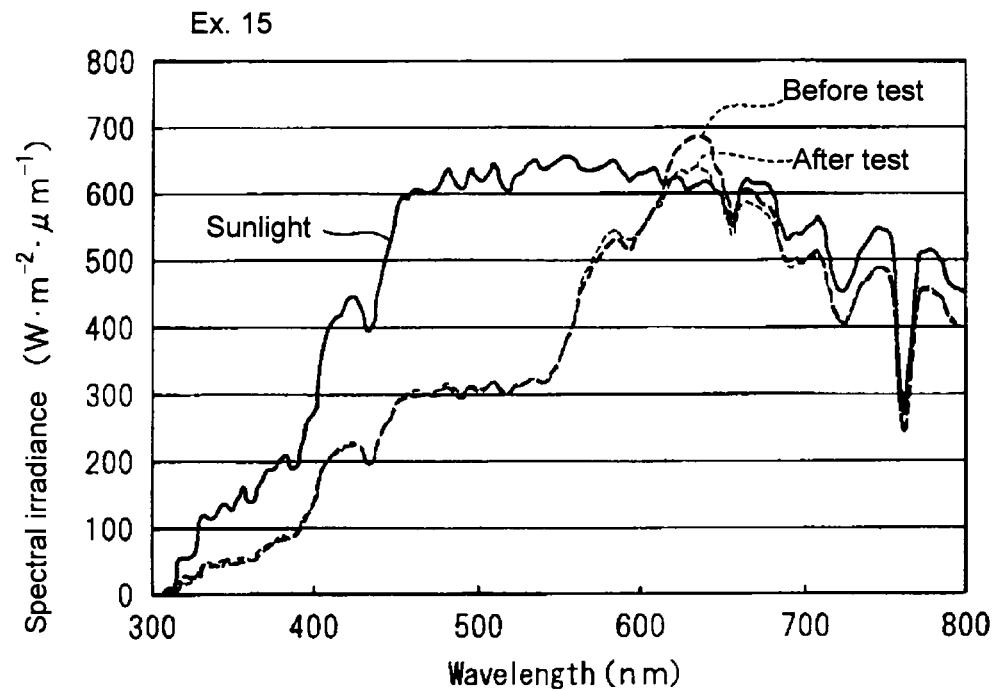
FIG. 20 is a spectral chart showing the spectral irradiances of sunlight and transmitted light through the wavelength conversion film in Example 15.

With respect to the wavelength conversion film, a 2,500-hour accelerated weather resistant test was carried out. The results are shown in Table 2 and FIG. 20.

Example 16

Production of Wavelength Conversion Film

A benzophenone ultraviolet absorbent (CHIMASSORB 81, manufactured by Chiba Japan), which is an organic ultraviolet blocking material, was used as the ultraviolet blocking material. 8 g of the organic ultraviolet blocking material and 4 kg of LLDPE were pelletized at 180° C. by a twin-screw extruder. The obtained pellets and pellets containing the wavelength converting material, produced in the same manner as in Example 15, were extrusion molded at 200° C. by a T-die to obtain a wavelength conversion film having a thickness of 100 μm.

Measurements for the wavelength conversion film were carried out in the same manner as in Example 15. The results are shown in Table 2.

Example 17

Production of Wavelength Conversion Film 80 g of the wavelength converting material in Example 15 and 8 kg of LLDPE were pelletized at 180° C. by a twin-screw extruder. The pellets were extrusion molded at 200° C. by a T-die to obtain a wavelength conversion film having a thickness of 100 μm.

Measurements for the wavelength conversion film were carried out in the same manner as in Example 15. The results are shown in Table 2.

Example 18

Production of Base Film

The base film of ETFE having a thickness of 100 μm was obtained in the same manner as in Example 10, except that a wavelength converting material or an inorganic ultraviolet blocking material was not added.

Production of Wavelength Conversion Film:

0.05 g of a perylene colorant (Lumogen F red 305, manufactured by BASF) and 1.0 g of zinc oxide covered with silica were dispersed in 40 g of a fluororesin varnish (LUMIFLON 600, manufactured by Asahi Glass Company, Limited, a xylene solution wherein a resin solid content is 50 mass %) to obtain a dispersion. The dispersion was applied on the surface of the base film so that the thickness of the coating after drying would be 10 μm, and dried to form the coating layer thereby to obtain a wavelength conversion film.

Measurements for the wavelength conversion film were carried out in the same manner as in Example 10. The results are shown in Table 2.

Example 19

Production of Wavelength Conversion Film

The wavelength conversion film was obtained in the same manner as in Example 18, except that 0.4 g of a benzophenone ultraviolet absorbent (CHIMASSORB 81, manufactured by Chiba Japan), which is an organic ultraviolet blocking material, was used as the ultraviolet blocking material.

Measurements for the wavelength conversion film were carried out in the same manner as in Example 10. The results are shown in Table 2.

Example 20

Production of Wavelength Conversion Film

The wavelength conversion film was obtained in the same manner as in Example 18, except that an ultraviolet blocking material was not added.

Measurements for the wavelength conversion film were carried out in the same manner as in Example 10. The results are shown in Table 2.

Example 21

Measurements for the base film of ETFE having a thickness of 100 μm were carried out in the same manner as in Example 10. The results are shown in Table 2.

Example 22

Measurements for the base film of LLDPE having a thickness of 100 μm were carried out in the same manner as in Example 15. The results are shown in Table 2.

In Examples 10 to 22, it can be said that the potential to absorb light remains, as the PAR ratio in the range of from 500 to 600 nm after accelerated weather resistant test is low, and the potential to emit light remains, as the PAR ratio in the range of from 600 to 700 nm after accelerated weather resistant test is high.

TABLE 2

| Examples | Base film layer | Coating layer | Ultraviolet blocking material | Wavelength converting material | Visible light transmittance (%) | Ultraviolet transmittance (%) | PAR ratio before accelerated resistance test (to sunlight) | | | PAR ratio after accelerated resistance test (to sunlight) | | |
|---|---|---|---|---|---|---|---|---|---|---|---|---|
| | | | | | | | 400-500 nm | 500-600 nm | 600-700 nm | 400-500 nm | 500-600 nm | 600-700 nm |
| 10 | ETFE | None | Cerium oxide covered with silica | Perylene colorant | 73.5 | 9.9 | 0.70 | 0.61 | 1.03 | 0.72 | 0.66 | 1.05 |
| 11 | ETFE | None | Cerium oxide covered with silica | Perylene colorant | 73.2 | 30.3 | 0.75 | 0.65 | 1.04 | 0.76 | 0.72 | 1.05 |
| 12 | ETFE | None | Benzophenone | Perylene colorant | 74.2 | 6.2 | 0.75 | 0.67 | 1.03 | 0.82 | 0.77 | 0.97 |
| 13 | ETFE | None | Benzophenone | Perylene colorant | 74.8 | 27.5 | 0.76 | 0.66 | 1.02 | 0.80 | 0.74 | 0.98 |
| 14 | ETFE | None | None | Perylene colorant | 78.5 | 71.3 | 0.78 | 0.66 | 1.02 | 0.80 | 0.73 | 1.00 |
| 15 | LLDPE | None | Cerium oxide covered with silica | Smart Light RL 1000 | 70.3 | 26.8 | 0.50 | 0.62 | 1.00 | 0.50 | 0.61 | 0.96 |
| 16 | LLDPE | None | Benzophenone | Smart Light RL 1000 | 70.7 | 27.9 | 0.51 | 0.63 | 1.00 | 0.52 | 0.63 | 0.91 |
| 17 | LLDPE | None | None | Smart Light RL 1000 | 67.9 | 39.5 | 0.49 | 0.60 | 0.99 | 0.51 | 0.61 | 0.93 |
| 18 | ETFE | Fluororesin varnish | Zinc oxide covered with silica | Perylene colorant | 77.5 | 10.2 | 0.73 | 0.65 | 1.07 | 0.78 | 0.71 | 1.04 |
| 19 | ETFE | Fluororesin varnish | Benzophenone | Perylene colorant | 76.8 | 10.8 | 0.71 | 0.67 | 1.06 | 0.83 | 0.83 | 1.00 |
| 20 | ETFE | Fluororesin varnish | None | Perylene colorant | 79.8 | 72.5 | 0.79 | 0.71 | 1.07 | 0.81 | 0.80 | 1.02 |
| 21 | ETFE | None | None | None | 94.3 | 83.7 | 0.95 | 0.96 | 0.96 | — | — | — |
| 22 | LLDPE | None | None | None | 90.2 | 64.3 | 0.89 | 0.90 | 0.90 | — | — | — |

It can be said that the films in Examples 10 and 11 are excellent in weather resistance because, after the accelerated weather resistant test, the PAR ratio in the range of from 500 to 600 nm does not become high, and the PAR ratio in the range of from 600 to 700 nm does not become low. In Example 10, the amount of added inorganic ultraviolet blocking material is larger than in Example 11, and the change of the PAR ratio in the range of from 500 to 600 nm is smaller than in Example 11. So, the film in Example 10 has superior weather resistance.

In Example 12, there is a wide difference in the PAR ratio in the range of from 500 to 600 nm or in the PAR ratio in the range of 600 to 700 nm between before and after the accelerate weather resistant test compared with Example 13. In Example 12, the amount of added organic ultraviolet blocking material is larger and the ultraviolet transmittance is lower (more ultraviolet ray is blocked) than in Example 13, however, it can be said that its wavelength converting material deteriorates more rapidly. And, it can be also said that in Example 12, the wavelength converting material deteriorates more rapidly than in Example 14, wherein an ultraviolet blocking material is not added.

The same can be said with respect to Examples 18 to 20. Among them, the film in Example 18, wherein an inorganic ultraviolet blocking material is added, is superior in weather resistance.

In Examples 15 to 17, the PAR ratio in the range of 500 to 600 nm does not change before and after the accelerate weather resistant test. From the PAR ratio in the range of 600 to 700 nm, it is evident that the film in Example 15, wherein an inorganic ultraviolet blocking material is added, has the best weather resistance, and the film in Example 16, wherein an organic ultraviolet blocking material is added, has the worst weather resistance.

INDUSTRIAL APPLICABILITY

The wavelength conversion film of the present invention is useful for an agricultural film, a cover film for photovoltaic generation, etc.

The entire disclosure of Japanese Patent Application No. 2007-100328 filed on Apr. 6, 2007 including specification, claims and summary is incorporated herein by reference in its entirety.

What is claimed is:

1. A wavelength conversion film comprising an inorganic ultraviolet blocking material and a wavelength converting material, and consisting of one or more layers, at least one of which is a base film layer comprising a thermoplastic resin, wherein the inorganic ultraviolet blocking material is a metal oxide covered with at least one selected from the group consisting of silica, zirconia and alumina, and the metal oxide is at least one selected from the group consisting of cerium oxide, zinc oxide, titanium oxide and iron oxide, and wherein the wavelength converting material comprises a perylene colorant.

2. The wavelength conversion film according to claim 1, which consists of one base film layer, wherein the base film layer comprises the above inorganic ultraviolet blocking material and the above wavelength converting material.

3. The wavelength conversion film according to claim 1, which consists of two or more layers, one of which comprises the above inorganic ultraviolet blocking material and the above wavelength converting material.

4. The wavelength conversion film according to claim 3, wherein the above base film layer consists of at least two layers.

5. The wavelength conversion film according to claim 3, wherein at least one layer is the above base film layer and at least another layer is a coating layer comprising a resin.

6. The wavelength conversion film according to claim 5, wherein at least one coating layer comprises a fluororesin as the resin.

7. The wavelength conversion film according to claim 1, which consists of two or more layers, one of which is an ultraviolet blocking layer comprising the above inorganic ultraviolet blocking material and another of which is a wavelength converting layer comprising the above wavelength converting material.

8. A structure using the wavelength conversion film as defined in claim 7, as a roofing material or a wall covering material, wherein the wavelength conversion film is disposed so that the ultraviolet blocking layer is on the sunlight-incoming side.

9. A structure using the wavelength conversion film as defined in claim 7 as a roofing material or a wall covering material, wherein the wavelength converting layer does not contain an inorganic ultraviolet blocking material, and wherein the ultraviolet blocking layer is disposed on the sunlight-incoming side.

10. The wavelength conversion film according to claim 1, wherein at least one base film layer comprises a thermoplastic fluororesin as the thermoplastic resin.

11. The wavelength conversion film according to claim 1, wherein the thermoplastic fluororesin is an ethylene/tetrafluoroethylene copolymer or polyvinylidene fluoride.

12. The wavelength conversion film according to claim 1, wherein the wavelength converting material is covered with at least one selected from the group consisting of silica, alumina, zirconia and a cross-linked acrylic resin.

13. An agricultural film made of the wavelength conversion film according to claim 1.

14. The agricultural film according to claim 13, which further has a droplet flowing layer formed on one or both sides of the wavelength conversion film.

* * * * *